US007826551B2

(12) United States Patent
Lee et al.

(10) Patent No.: US 7,826,551 B2
(45) Date of Patent: Nov. 2, 2010

(54) INPUT AND OUTPUT DRIVER CIRCUITS FOR DIFFERENTIAL SIGNAL TRANSFER, AND DIFFERENTIAL SIGNAL TRANSFER APPARATUS AND METHODS

(75) Inventors: Hee-Seok Lee, Hwaseong-si (KR); Sung-hwan Min, Ansan-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 769 days.

(21) Appl. No.: 11/501,786

(22) Filed: Aug. 10, 2006

(65) Prior Publication Data

US 2007/0071113 A1  Mar. 29, 2007

(30) Foreign Application Priority Data

Aug. 10, 2005  (KR) ............... 10-2005-0073459

(51) Int. Cl.
*H04B 3/46* (2006.01)
*H04B 17/00* (2006.01)
*H04Q 1/20* (2006.01)

(52) U.S. Cl. .................. 375/288; 327/64; 327/65; 375/260

(58) Field of Classification Search ........... 327/64–65; 375/286, 288, 259–260
See application file for complete search history.

(56) References Cited

U.S. PATENT DOCUMENTS

| 5,166,956 | A | 11/1992 | Baltus et al. | |
| 2004/0057525 | A1* | 3/2004 | Rajan et al. | 375/257 |
| 2004/0239374 | A1* | 12/2004 | Hori | 327/65 |
| 2006/0013331 | A1* | 1/2006 | Choi et al. | 375/288 |
| 2009/0001348 | A1* | 1/2009 | Kaeriyama et al. | 257/4 |

FOREIGN PATENT DOCUMENTS

| JP | 11-231984 | 8/1999 |
| JP | 2002-152287 | 5/2002 |
| JP | 2004-356714 | 12/2004 |

* cited by examiner

*Primary Examiner*—David C Payne
*Assistant Examiner*—James M Perez
(74) *Attorney, Agent, or Firm*—Volentine & Whitt, PLLC

(57) ABSTRACT

In one aspect, a differential signal transfer method is provided which includes converting $2^M-1$ original signals into $2^M-1$ differential signal pairs, where M is an integer of 2 or more, and wherein each pair consists of a first differential signal and a second differential signal having opposite phases, and transferring the $2^M-1$ differential signal pairs to $2^M$ signal lines such that each of the $2^M$ signal lines includes overlapping differential signals among the first differential signals and the second differential signals of the $2^M-1$ differential signal pairs.

17 Claims, 17 Drawing Sheets

FIG. 3 (PRIOR ART)

(a)
$$\begin{bmatrix} V_{P\_1} \\ V_{P\_2} \\ V_{P\_3} \\ V_{P\_4} \\ \vdots \\ V_{P\_N\_3} \\ V_{P\_N-2} \\ V_{P\_N-1} \\ V_{P\_N} \end{bmatrix} = \frac{1}{2} SM \begin{bmatrix} V_{L\_1} \\ V_{L\_2} \\ V_{L\_3} \\ V_{L\_4} \\ \vdots \\ V_{L\_R\_3} \\ V_{L\_R-2} \\ V_{L\_R-1} \\ V_{L\_R} \end{bmatrix}$$

(b) WHEN N=4

$$SM = \begin{bmatrix} 1 & -1 & 0 & 0 \\ 0 & 0 & 1 & -1 \\ 1 & 1 & 0 & 0 \\ 0 & 0 & 1 & 1 \end{bmatrix}$$

(c) WHEN N=8

$$SM = \begin{bmatrix} 1 & -1 & 0 & 0 & 0 & 0 & 0 & 0 \\ 0 & 0 & 1 & -1 & 0 & 0 & 0 & 0 \\ 0 & 0 & 0 & 0 & 1 & -1 & 0 & 0 \\ 0 & 0 & 0 & 0 & 0 & 0 & 1 & -1 \\ 1 & 1 & 0 & 0 & 1 & 1 & 0 & 0 \\ 0 & 0 & 1 & 1 & 0 & 0 & 1 & 1 \\ 1 & 1 & 1 & 1 & 0 & 0 & 0 & 0 \\ 0 & 0 & 0 & 0 & 1 & 1 & 1 & 1 \end{bmatrix}$$

(d) WHEN N=16

$$SM = \begin{bmatrix} 1 & -1 & 0 & 0 & 0 & 0 & 0 & 0 & 0 & 0 & 0 & 0 & 0 & 0 & 0 & 0 \\ 0 & 0 & 1 & -1 & 0 & 0 & 0 & 0 & 0 & 0 & 0 & 0 & 0 & 0 & 0 & 0 \\ 0 & 0 & 0 & 0 & 1 & -1 & 0 & 0 & 0 & 0 & 0 & 0 & 0 & 0 & 0 & 0 \\ 0 & 0 & 0 & 0 & 0 & 0 & 1 & -1 & 0 & 0 & 0 & 0 & 0 & 0 & 0 & 0 \\ 0 & 0 & 0 & 0 & 0 & 0 & 0 & 0 & 1 & -1 & 0 & 0 & 0 & 0 & 0 & 0 \\ 0 & 0 & 0 & 0 & 0 & 0 & 0 & 0 & 0 & 0 & 1 & -1 & 0 & 0 & 0 & 0 \\ 0 & 0 & 0 & 0 & 0 & 0 & 0 & 0 & 0 & 0 & 0 & 0 & 1 & -1 & 0 & 0 \\ 0 & 0 & 0 & 0 & 0 & 0 & 0 & 0 & 0 & 0 & 0 & 0 & 0 & 0 & 1 & -1 \\ 1 & 1 & 0 & 0 & 1 & 1 & 0 & 0 & 1 & 1 & 0 & 0 & 1 & 1 & 0 & 0 \\ 0 & 0 & 1 & 1 & 0 & 0 & 1 & 1 & 0 & 0 & 1 & 1 & 0 & 0 & 1 & 1 \\ 1 & 1 & 1 & 1 & 0 & 0 & 0 & 0 & 1 & 1 & 1 & 1 & 0 & 0 & 0 & 0 \\ 0 & 0 & 0 & 0 & 1 & 1 & 1 & 1 & 0 & 0 & 0 & 0 & 1 & 1 & 1 & 1 \\ 1 & 1 & 1 & 1 & 1 & 1 & 1 & 1 & 0 & 0 & 0 & 0 & 0 & 0 & 0 & 0 \\ 0 & 0 & 0 & 0 & 0 & 0 & 0 & 0 & 1 & 1 & 1 & 1 & 1 & 1 & 1 & 1 \\ 1 & 1 & 1 & 1 & 1 & 1 & 1 & 1 & 1 & 1 & 1 & 1 & 1 & 1 & 1 & 1 \\ 0 & 0 & 0 & 0 & 0 & 0 & 0 & 0 & 0 & 0 & 0 & 0 & 0 & 0 & 0 & 0 \end{bmatrix}$$

FIG. 7

(a)
$$\begin{bmatrix} V_{P\_1} \\ V_{P\_2} \\ V_{P\_3} \\ V_{P\_4} \\ \vdots \\ V_{P\_N\_3} \\ V_{P\_N-2} \\ V_{P\_N-1} \\ V_{P\_N} \end{bmatrix} = SM^{-1}DM \begin{bmatrix} V_{L\_1} \\ V_{L\_2} \\ V_{L\_3} \\ V_{L\_4} \\ \vdots \\ V_{L\_2^{n}-3} \\ V_{L\_2^{n}-2} \\ V_{L\_2^{n}-1} \\ V_{L\_2^{n}} \end{bmatrix}$$

(b)
$$DM = \begin{bmatrix} 1 & 0 & 0 & 0 & \cdots & 0 \\ 0 & 1 & 0 & 0 & \cdots & 0 \\ 0 & 0 & 1 & 0 & \cdots & 0 \\ 0 & 0 & 0 & 1 & \cdots & 0 \\ \vdots & \vdots & \vdots & \vdots & \ddots & \vdots \\ 0 & 0 & 0 & 0 & \cdots & 1 \\ 0 & 0 & 0 & 0 & \cdots & 0 \end{bmatrix}$$

(c) When N=4
$$SM^{-1} = \begin{bmatrix} 1/2 & 0 & 1/4 & 1/4 \\ -1/2 & 0 & 1/4 & 1/4 \\ 0 & 1/2 & -1/4 & 1/4 \\ 0 & -1/2 & -1/4 & 1/4 \end{bmatrix}$$

(d) When N=8
$$SM^{-1} = \begin{bmatrix} 1/2 & 0 & 0 & 0 & 1/4 & 0 & 1/8 & 1/8 \\ -1/2 & 0 & 0 & 0 & 1/4 & 0 & 1/8 & 1/8 \\ 0 & 1/2 & 0 & 0 & -1/4 & 0 & 1/8 & 1/8 \\ 0 & -1/2 & 0 & 0 & -1/4 & 0 & 1/8 & 1/8 \\ 0 & 0 & 1/2 & 0 & 0 & 1/4 & -1/8 & 1/8 \\ 0 & 0 & -1/2 & 0 & 0 & 1/4 & -1/8 & 1/8 \\ 0 & 0 & 0 & 1/2 & 0 & -1/4 & -1/8 & 1/8 \\ 0 & 0 & 0 & -1/2 & 0 & -1/4 & -1/8 & 1/8 \end{bmatrix}$$

FIG. 7

(e) When N=16

$$SM^{-1} = \begin{bmatrix} 1/2 & 0 & 0 & 0 & 0 & 0 & 0 & 0 & 1/4 & 0 & 0 & 0 & 1/8 & 0 & 1/16 & 1/16 \\ -1/2 & 0 & 0 & 0 & 0 & 0 & 0 & 0 & 1/4 & 0 & 0 & 0 & 1/8 & 0 & 1/16 & 1/16 \\ 0 & 1/2 & 0 & 0 & 0 & 0 & 0 & 0 & -1/4 & 0 & 0 & 0 & 1/8 & 0 & 1/16 & 1/16 \\ 0 & -1/2 & 0 & 0 & 0 & 0 & 0 & 0 & -1/4 & 0 & 0 & 0 & 1/8 & 0 & 1/16 & 1/16 \\ 0 & 0 & 1/2 & 0 & 0 & 0 & 0 & 0 & 0 & 1/4 & 0 & 0 & -1/8 & 0 & 1/16 & 1/16 \\ 0 & 0 & -1/2 & 0 & 0 & 0 & 0 & 0 & 0 & 1/4 & 0 & 0 & -1/8 & 0 & 1/16 & 1/16 \\ 0 & 0 & 0 & 1/2 & 0 & 0 & 0 & 0 & 0 & -1/4 & 0 & 0 & -1/8 & 0 & 1/16 & 1/16 \\ 0 & 0 & 0 & -1/2 & 0 & 0 & 0 & 0 & 0 & -1/4 & 0 & 0 & -1/8 & 0 & 1/16 & 1/16 \\ 0 & 0 & 0 & 0 & 1/2 & 0 & 0 & 0 & 0 & 0 & 1/4 & 0 & 1/8 & -1/16 & 1/16 \\ 0 & 0 & 0 & 0 & -1/2 & 0 & 0 & 0 & 0 & 0 & 1/4 & 0 & 1/8 & -1/16 & 1/16 \\ 0 & 0 & 0 & 0 & 0 & 1/2 & 0 & 0 & 0 & 0 & -1/4 & 0 & 1/8 & -1/16 & 1/16 \\ 0 & 0 & 0 & 0 & 0 & -1/2 & 0 & 0 & 0 & 0 & -1/4 & 0 & 1/8 & -1/16 & 1/16 \\ 0 & 0 & 0 & 0 & 0 & 0 & 1/2 & 0 & 0 & 0 & 0 & 1/4 & 0 & -1/8 & -1/16 & 1/16 \\ 0 & 0 & 0 & 0 & 0 & 0 & -1/2 & 0 & 0 & 0 & 0 & 1/4 & 0 & -1/8 & -1/16 & 1/16 \\ 0 & 0 & 0 & 0 & 0 & 0 & 0 & 1/2 & 0 & 0 & 0 & -1/4 & 0 & -1/8 & -1/16 & 1/16 \\ 0 & 0 & 0 & 0 & 0 & 0 & 0 & -1/2 & 0 & 0 & 0 & -1/4 & 0 & -1/8 & -1/16 & 1/16 \end{bmatrix}$$

FIG. 12

(a)
$$\begin{bmatrix} V_{L\_1} \\ V_{L\_2} \\ V_{L\_3} \\ V_{L\_4} \\ \vdots \\ V_{L\_2^\nu-3} \\ V_{L\_2^\nu-2} \\ V_{L\_2^\nu-1} \\ V_{L\_2^\nu} \end{bmatrix} = DM^{-1}SM \begin{bmatrix} V_{P\_1} \\ V_{P\_2} \\ V_{P\_3} \\ V_{P\_4} \\ \vdots \\ V_{P\_N\_3} \\ V_{P\_N-2} \\ V_{P\_N-1} \\ V_{P\_N} \end{bmatrix}$$

(b) WHEN N=4

$$SM = \begin{bmatrix} 1 & -1 & 0 & 0 \\ 0 & 0 & 1 & 1 \\ 1 & 1 & -1 & -1 \\ 1 & 1 & 1 & 1 \end{bmatrix}$$

(c) WHEN N=8

$$SM = \begin{bmatrix} 1 & -1 & 0 & 0 & 0 & 0 & 0 & 0 \\ 0 & 0 & 1 & -1 & 0 & 0 & 0 & 0 \\ 0 & 0 & 0 & 0 & 1 & -1 & 0 & 0 \\ 0 & 0 & 0 & 0 & 0 & 0 & 1 & -1 \\ 1 & 1 & -1 & -1 & 0 & 0 & 0 & 0 \\ 0 & 0 & 0 & 0 & 1 & 1 & -1 & -1 \\ 1 & 1 & 1 & 1 & -1 & -1 & -1 & -1 \\ 1 & 1 & 1 & 1 & 1 & 1 & 1 & 1 \end{bmatrix}$$

(d) WHEN N=16

$$SM = \begin{bmatrix} 1 & -1 & 0 & 0 & 0 & 0 & 0 & 0 & 0 & 0 & 0 & 0 & 0 & 0 & 0 & 0 \\ 0 & 0 & 1 & -1 & 0 & 0 & 0 & 0 & 0 & 0 & 0 & 0 & 0 & 0 & 0 & 0 \\ 0 & 0 & 0 & 0 & 1 & -1 & 0 & 0 & 0 & 0 & 0 & 0 & 0 & 0 & 0 & 0 \\ 0 & 0 & 0 & 0 & 0 & 0 & 1 & -1 & 0 & 0 & 0 & 0 & 0 & 0 & 0 & 0 \\ 0 & 0 & 0 & 0 & 0 & 0 & 0 & 0 & 1 & -1 & 0 & 0 & 0 & 0 & 0 & 0 \\ 0 & 0 & 0 & 0 & 0 & 0 & 0 & 0 & 0 & 0 & 1 & -1 & 0 & 0 & 0 & 0 \\ 0 & 0 & 0 & 0 & 0 & 0 & 0 & 0 & 0 & 0 & 0 & 0 & 1 & -1 & 0 & 0 \\ 0 & 0 & 0 & 0 & 0 & 0 & 0 & 0 & 0 & 0 & 0 & 0 & 0 & 0 & 1 & -1 \\ 1 & 1 & -1 & -1 & 0 & 0 & 0 & 0 & 0 & 0 & 0 & 0 & 0 & 0 & 0 & 0 \\ 0 & 0 & 0 & 0 & 1 & 1 & -1 & -1 & 0 & 0 & 0 & 0 & 0 & 0 & 0 & 0 \\ 0 & 0 & 0 & 0 & 0 & 0 & 0 & 0 & 1 & 1 & -1 & -1 & 0 & 0 & 0 & 0 \\ 0 & 0 & 0 & 0 & 0 & 0 & 0 & 0 & 0 & 0 & 0 & 0 & 1 & 1 & -1 & -1 \\ 1 & 1 & 1 & 1 & -1 & -1 & -1 & -1 & 0 & 0 & 0 & 0 & 0 & 0 & 0 & 0 \\ 0 & 0 & 0 & 0 & 0 & 0 & 0 & 0 & 1 & 1 & 1 & 1 & -1 & -1 & -1 & -1 \\ 1 & 1 & 1 & 1 & 1 & 1 & 1 & 1 & -1 & -1 & -1 & -1 & -1 & -1 & -1 & -1 \\ 1 & 1 & 1 & 1 & 1 & 1 & 1 & 1 & 1 & 1 & 1 & 1 & 1 & 1 & 1 & 1 \end{bmatrix}$$

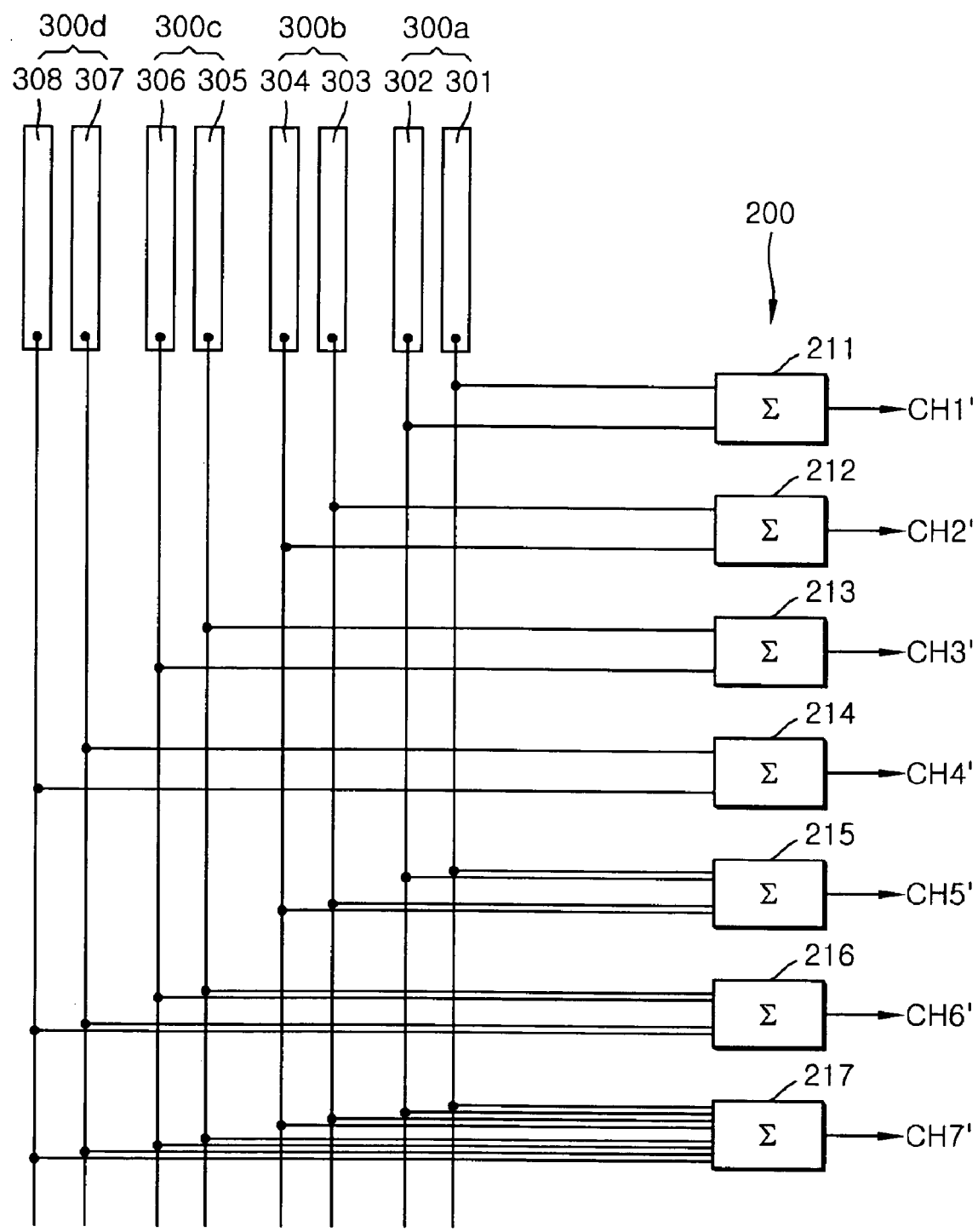

US 7,826,551 B2

INPUT AND OUTPUT DRIVER CIRCUITS FOR DIFFERENTIAL SIGNAL TRANSFER, AND DIFFERENTIAL SIGNAL TRANSFER APPARATUS AND METHODS

BACKGROUND OF THE INVENTION

1. Field of the Invention

The present invention generally relates to differential signal transfer, and more particularly, the present invention relates to input driver circuits and output driver circuits for transferring differential signals, and to differential signal transfer apparatus and methods related thereto.

A claim of priority is made to Korean Patent Application No. 10-2006-0073459, filed on Aug. 10, 2006, in the Korean Intellectual Property Office, the disclosure of which is incorporated herein in its entirety by reference.

2. Description of the Related Art

Differential signal transfer is generally characterized by the utilization of two physical signal lines to transfer one bit of data. The two signal lines carry respective signals which are inverted relative to one another to denote bit information, e.g., one signal line may carry a negative (−) signal, while the other signal line may carry a positive (+) signal. When compared to single-ended signaling methods having a single signal line, differential signal transfer methods operate more favorably with respect to electromagnetic interference/electromagnetic compatibility (EMI/EMC) related issues. Also, far-field noise cancellation of differential signal transfer makes such methods more resistant to external noises such as cross-talk. As such, differential signal transfer methods are widely used in various digital display apparatuses such as plasma display panel (PDP) driver circuits, liquid crystal display (LCD) driver circuits, data interfaces in storage applications, multi-bit data buses in dynamic random access memories (DRAM), module interfaces in mobile devices, and so on.

FIG. 1 is a diagram illustrating a conventional differential signal transfer apparatus which includes an output driver circuit 10, an input driver circuit 20, and signal lines 30 arranged between the output driver circuit 10 and the input driver circuit 20.

Referring to FIG. 1, the output driver circuit 10 receives R channel signals CH1 through CHR and generates R pairs of differential signals on N signal lines 30 (N=2 R), and the input driver circuit 20 receives the R pairs of differential signals and generates R channel signals CH1' through CHR'. In the figure, the N signal lines are identified by reference numbers P_1 through P_N. In addition, the R pairs of signal lines are identified by reference numbers 31 through 3r, and signals lines making up each pair are identified by reference numbers 31a/31b through 3ra/3rb. The number of signal lines 30 is dependent upon on the number of channels to be transferred. In particular, the conventional differential signal transfer apparatus requires 2 R signal lines 30 to differentially transfer R channel signals.

FIG. 2 is a view for explaining the operation of the conventional output driver circuit of FIG. 1. FIG. 2 illustrates an example where four (4) channel signals are transmitted through eight (8) signal lines 30.

Referring to FIG. 2, a first output buffer 11 converts a first channel signal CH1 into a first pair of differential signals (CH1(+), CH1(−)) which are transmitted through the respective signal lines 31a and 31b of the first signal line pair 31. A second output buffer 12 converts a second channel signal CH2 into a second pair of differential signals (CH2(+), CH2(−)) which are transmitted through the respective signal lines 32a and 32b of the second signal line pair 32. A third output buffer 13 converts a third channel signal CH3 into a third pair of differential signals (CH3(+), CH3(−)) which are transmitted through the respective signal lines 33a and 33b of the third signal line pair 33. Finally, a fourth output buffer 14 converts a fourth channel signal CH4 into a fourth pair of differential signals (CH4(+), CH4(−)) which are transmitted through the respective signal lines 34a and 34b of the fourth signal line pair 34. Here, (+) denote a positive differential signal among each pair of differential signals of opposite phases, and (−) denotes a negative differential signal among each pair of differential signals of opposite phases.

FIG. 3(a) shows a matrix transformation equation associated with the conventional differential transfer method. Here, "SM" denotes a signal matrix containing transformation coefficients, $V_{P-1}, V_{P-2}, \ldots, V_{P-N-1}, V_{P-N}$ denote signal levels of differential signals (+1 or −1) transmitted through the signal lines (31a, 31b), ..., (3ra, 3rb) of the signal line pairs 31 through 3r, and $V_{L-1}, V_{L-2}, \ldots, V_{L-R-1}, V_{L-R}$ denote signal levels (0 or 1) of channel signals provided to the respective channels CH1 through CHR.

FIGS. 3(b), 3(c) and 3(d) illustrates expanded signal matrices SM in examples where the number of signal lines N=4, 8, and 16, respectively. However, referring to the matrix equation of FIG. 3(a), since the number of input channel signals R is one-half of N (R=½N), only half the coefficients of the expanded signal matrices SM of FIGS. 3(b), 3(c) and 3(d) can be utilized in the differential signal transformation. For example, when N=4, only the coefficients 1-100 and 001-1 may be utilized.

Conventional differential signal transfer methods offer the advantage of reducing noise by transmitting signals of opposite phases through separate signal lines. However, in order to maintain a data bus width and a data speed per channel, it is necessary to provides two differential signal lines per input channel. This can prove troublesome in appliances having limited available space resources.

SUMMARY OF THE INVENTION

According to an aspect of the present invention, a differential signal transfer method is provided which includes converting $2^M-1$ original signals into $2^M-1$ differential signal pairs, where M is an integer of 2 or more, and wherein each pair consists of a first differential signal and a second differential signal having opposite phases, and transferring the $2^M-1$ differential signal pairs to $2^M$ signal lines such that each of the $2^M$ signal lines includes overlapping differential signals among the first differential signals and the second differential signals of the $2^M-1$ differential signal pairs.

According to another aspect of the present invention, a differential signal transfer method is provided which includes receiving a plurality of differential signals transferred through $2^M$ signal lines, where M is an integer of 2 or more, and restoring $2^M-1$ original signals from the differential signals, wherein the $2^M-1$ original signals are divided into M sets of original signals, where each m-th set (m=1 to M) of original signals includes $2^{M-m}$ original signals, and wherein each of the $2^{M-m}$ original signals of each m-th set is restored by overlapping the differential signals from $2^m$ of the signal lines.

According to still another aspect of the present invention, a differential signal transfer method is provided which includes converting $2^M-1$ original signals into $2^M-1$ differential signal pairs, where M is an integer of 2 or more, and wherein each pair consists of a first differential signal and a second differential signal having opposite phases, and overlapping M differential signals of the first differential signals and the second differential signals of the $2^M-1$ differential signal pairs and generating $2^M$ overlapping differential signals. The method further includes transferring the $2^M$ overlapping differential signals to the $2^M$ signal lines, respectively, and overlapping the $2^M$ overlapping differential signals that are transferred to the $2^M$ signal lines to restore the $2^M-1$ original signals.

According to yet another aspect of the present invention, a differential signal transfer method is provided which includes converting $2^{M-1}$ original signals into $2^M/2$ pseudo differential signal pairs, where M is an integer of 2 or more, and wherein each pseudo differential signal pair a first pseudo differential signal and a second pseudo differential signal having opposite phases, and transferring the $2^M/2$ pseudo differential signal pairs on respective $2^M$ signal lines.

According to another aspect of the present invention, an output driver circuit is provided which includes a plurality of channels which respective supply $2^M-1$ original binary signals, a signal converter which converts the $2^M-1$ original signals into $2^M-1$ differential signal pairs, each differential signal pair including of a first differential signal and a second differential signal having opposite phases, and a signal overlapping unit which overlaps the $2^M-1$ differential signal pairs onto $2^M$ signal lines such that each of the $2^M$ signal lines includes overlapping differential signals among the first differential signals and the second differential signals of the $2^M-1$ differential signal pairs.

According to still another aspect of the present invention, an input driver circuit is provided which includes a plurality of signal lines which supplies $2^M$ pseudo differential signals, and a plurality of adders which restore $2^M-1$ original signals from $2^M$ pseudo the differential signals.

According to yet another aspect of the present invention, a differential signal transfer apparatus is provided which includes a plurality of channels which supply $2^M-1$ original binary signals, where M is an integer of 2 or more, and a first driver circuit which converts the $2^M-1$ original signals provided from the channels into $2^M-1$ differential signal pairs, wherein each differential pair includes a first differential signal and a second differential signal having opposite phases, and which overlaps M differential signals of the first differential signals and the second differential signals of the $2^M-1$ differential signal pairs to output $2^M$ overlapping signals. The apparatus further includes a second driver circuit which converts the $2^M$ overlapping signals into the $2^M-1$ original binary signals, and an interconnection unit which includes $2^M$ signal lines for respectively transferring the $2^M$ overlapping signals provided from the first driver circuit to the second driver circuit.

According to another aspect of the present invention, a semiconductor integrated circuit is provided which includes a plurality of channels which supply $2^M-1$ original binary signals, where M is an integer of 2 or more, a first driver circuit which converts the $2^M-1$ original signals provided from the channels into $2^M-1$ differential signal pairs, wherein each differential pair includes a first differential signal and a second differential signal having opposite phases, and which overlaps M differential signals of the first differential signals and the second differential signals of the $2^M-1$ differential signal pairs to output $2^M$ overlapping signals, and a second driver circuit which converts the $2^M$ overlapping signals into the $2^M-1$ original binary signals.

BRIEF DESCRIPTION OF THE DRAWINGS

The above and other features and advantages of the present invention will become readily apparent from the detailed description that follows, with reference to the accompanying drawings, in which:

FIG. 3 illustrates matrices for explaining an operation of the conventional differential signal transfer apparatus;

FIG. 7 illustrates a matrix for a differential signal converting method, according to an embodiment of the present invention;

FIG. 12 illustrates a matrix for a method of restoring original channel signals from differential signals, according to an embodiment of the present invention;

FIG. 13 illustrates a circuit diagram of the input driver circuit according to the embodiment of the present invention;

DETAILED DESCRIPTION OF EMBODIMENTS

The present invention will now be described more fully with reference to the accompanying drawings, in which exemplary embodiments of the invention are shown. The invention may, however, be embodied in many different forms and should not be construed as being limited to the embodiments set forth herein.

Embodiments of the invention will now be described with reference to the drawings.

Figure 1:
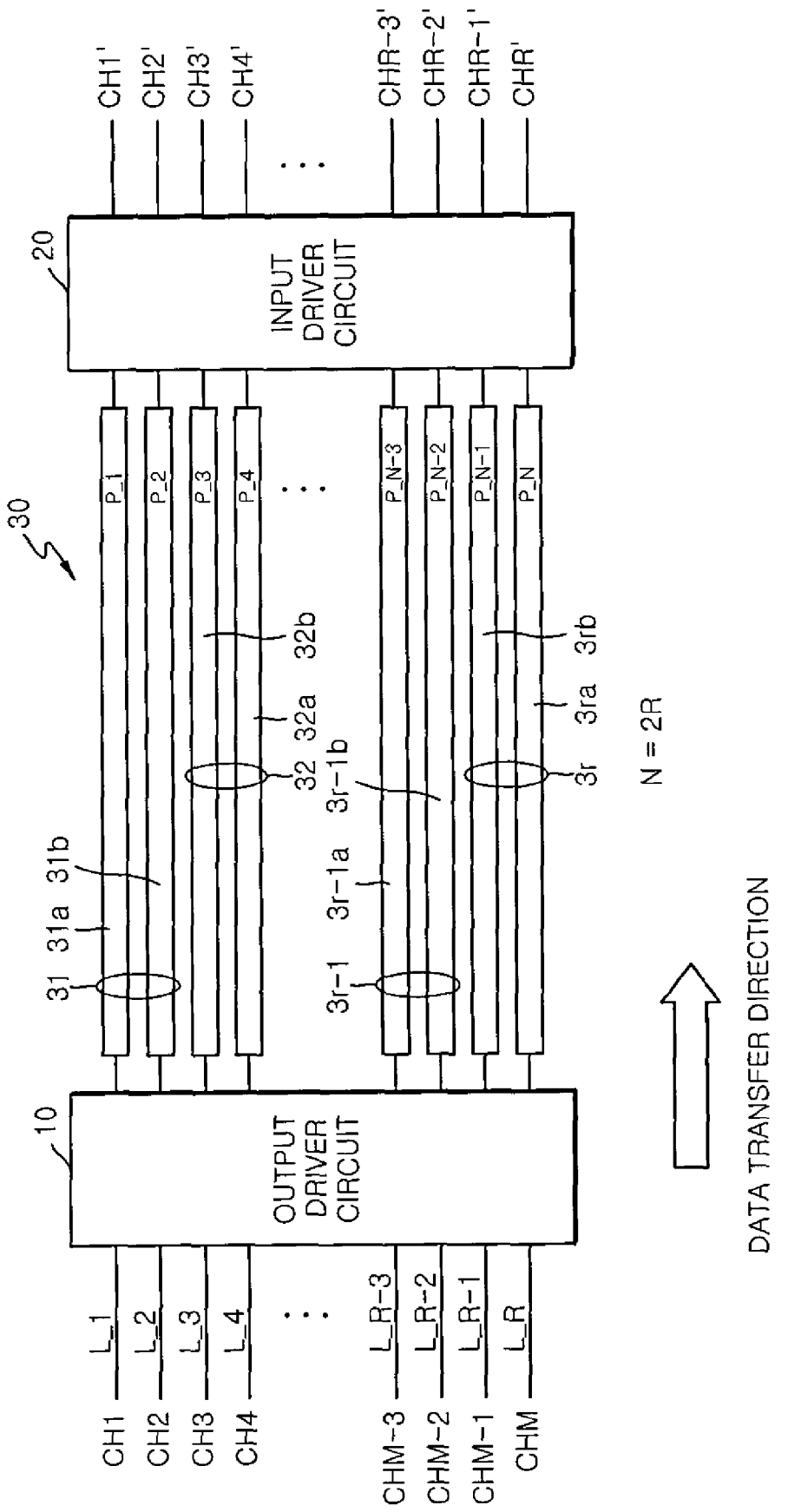
FIG. 1 illustrates a conventional differential signal transfer apparatus.
Figure 2:
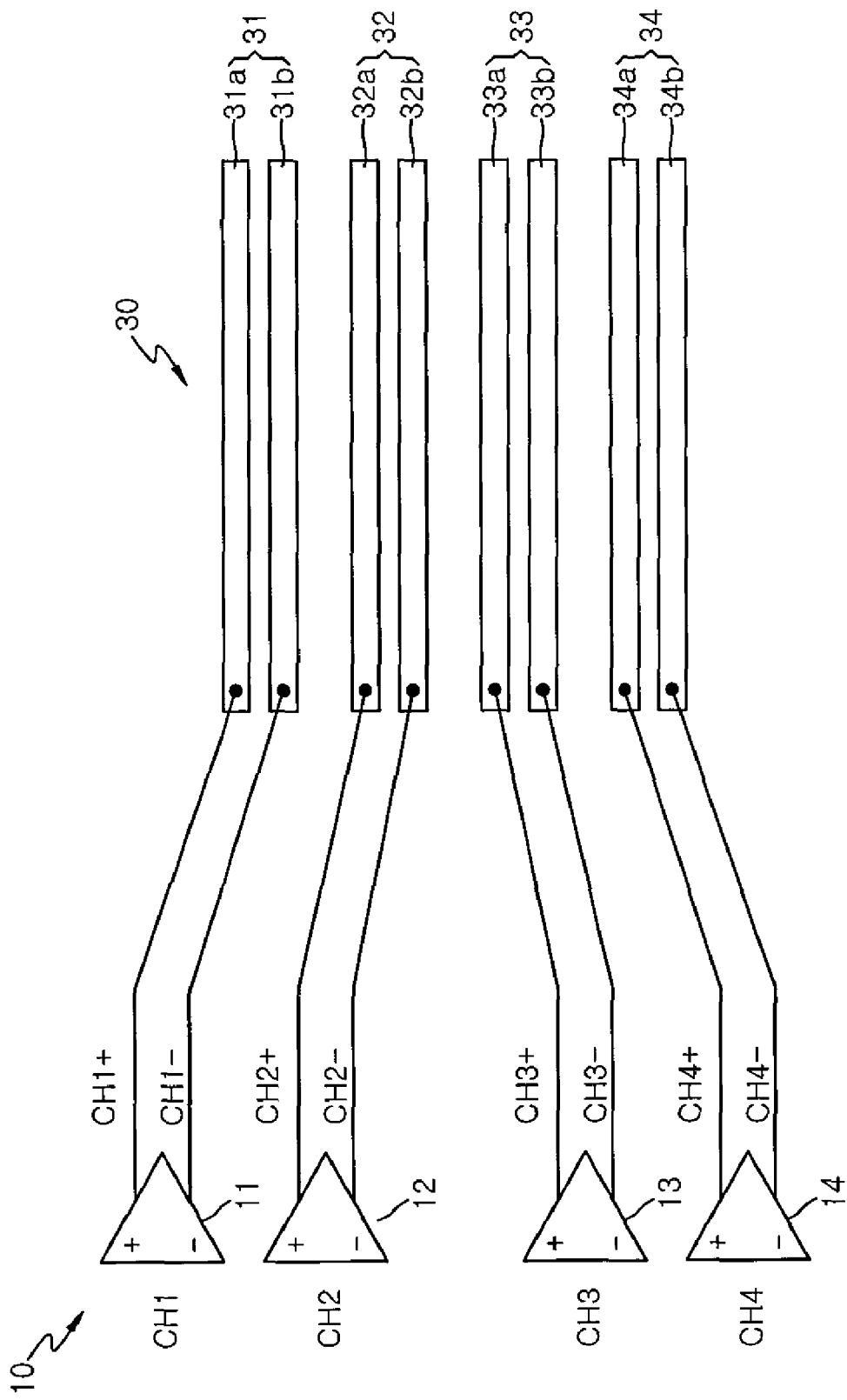
FIG. 2 illustrates the manner in which channel signals are converted to differential signals in a conventional differential signal apparatus.
Figure 4:
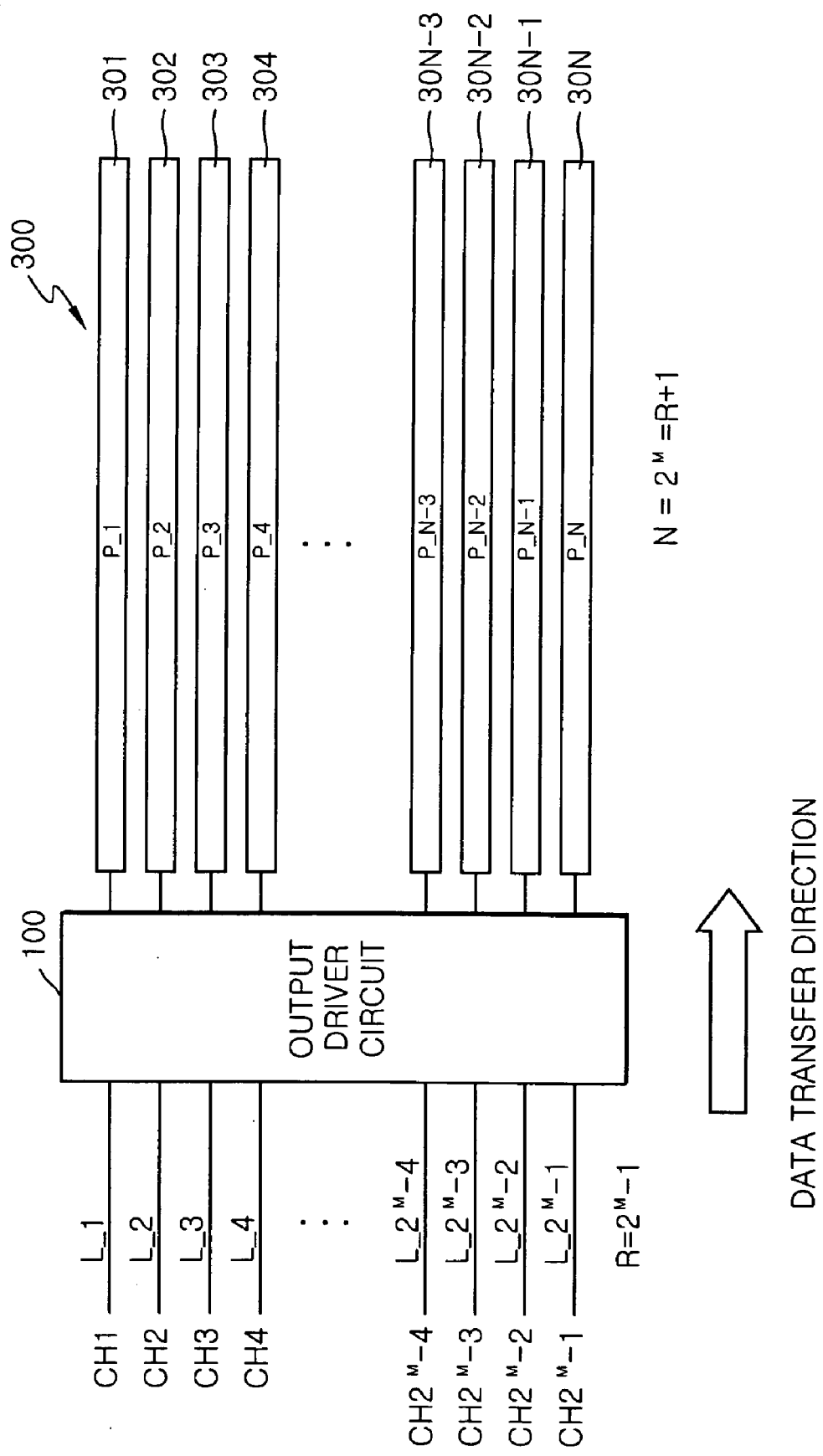
FIG. 4 illustrates an output driver circuit for transferring differential signals according to an embodiment of the present invention.

Referring initially to FIG. 4, an output driver circuit 100 receives R input binary (0 and 1) channel signals CH1 through CH2$^{M}$-1 (where R=2$^{M}$-1), and outputs corresponding differential signals on N signal lines 301 through 30N (where N=2$^{M}$=R+1). The signal lines 301 through 30N are collectively referred to herein as an interconnection unit 300. Also, in the figure, the input channel lines are denoted by reference numbers L_1 though L_2$^{M}$-1, and the differential lines are denoted by reference numbers P_1 through P_N.

The output driver circuit 100 converts the channel signals CH1 through CH2$^{M}$-1 into a plurality of differential signal pairs. Each differential signal pair includes a first differential signal and a second differential signal having opposite phases. As will be explained in more detail later, the first and second differential signals of M different arbitrary channels are made to overlap and provided to the interconnection unit 300. These overlapping signals are provided to and transferred through the respective signal lines 301 through 30N.

Figure 5:
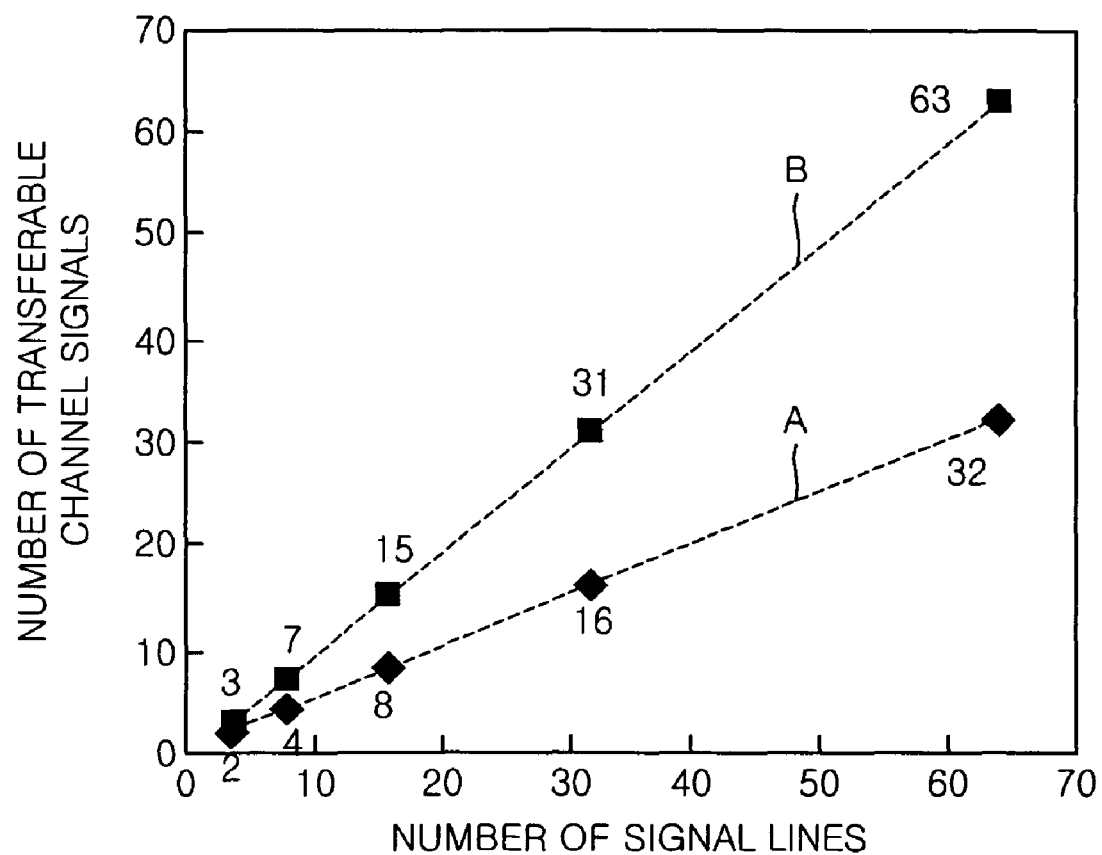
FIG. 5 is a graph illustrating a relationship between the number of signal lines and the number of transferable channel signals for the differential signal transfer method according to an embodiment of the present invention and the conventional differential signal transfer method.

FIG. 5 is a graph illustrating the relationship between the number (N) of signal lines and the number (R) of transferable channel signals for a differential signal transfer method according to an embodiment of the present invention and a conventional differential signal transfer method. In FIG. 5, plot A is a graph of the number of transferable channel signals with respect to the number of differential signal lines of the interconnection unit for the conventional differential signal transfer method. The plot B is a graph of the number of transferable channel signals with respect to the number of differential signal lines of the interconnection unit for the differential signal transfer method according to an embodiment the present invention.

Referring to FIG. 5, if the conventional interconnection unit consists of N signal lines, N/2 channel signals can be transferred. On the other hand, if the interconnection unit of the present embodiment consists of N signal lines, N−1 channel signals can be transferred. That is, according to the present embodiment, 2$^{M}$−1 channel signals can be transferred through 2$^{M}$ signal lines. As one example, in the case where sixteen (16) differential signals lines are provided, the conventional method allows for transferring of eight (8) channel signals, whereas the present embodiment allows for transferring of fifteen (15) channels signals. When compared to the conventional methods, the reduction in the number of signals lines realized by the present embodiment increases as the number of channels increases.

Figure 6:
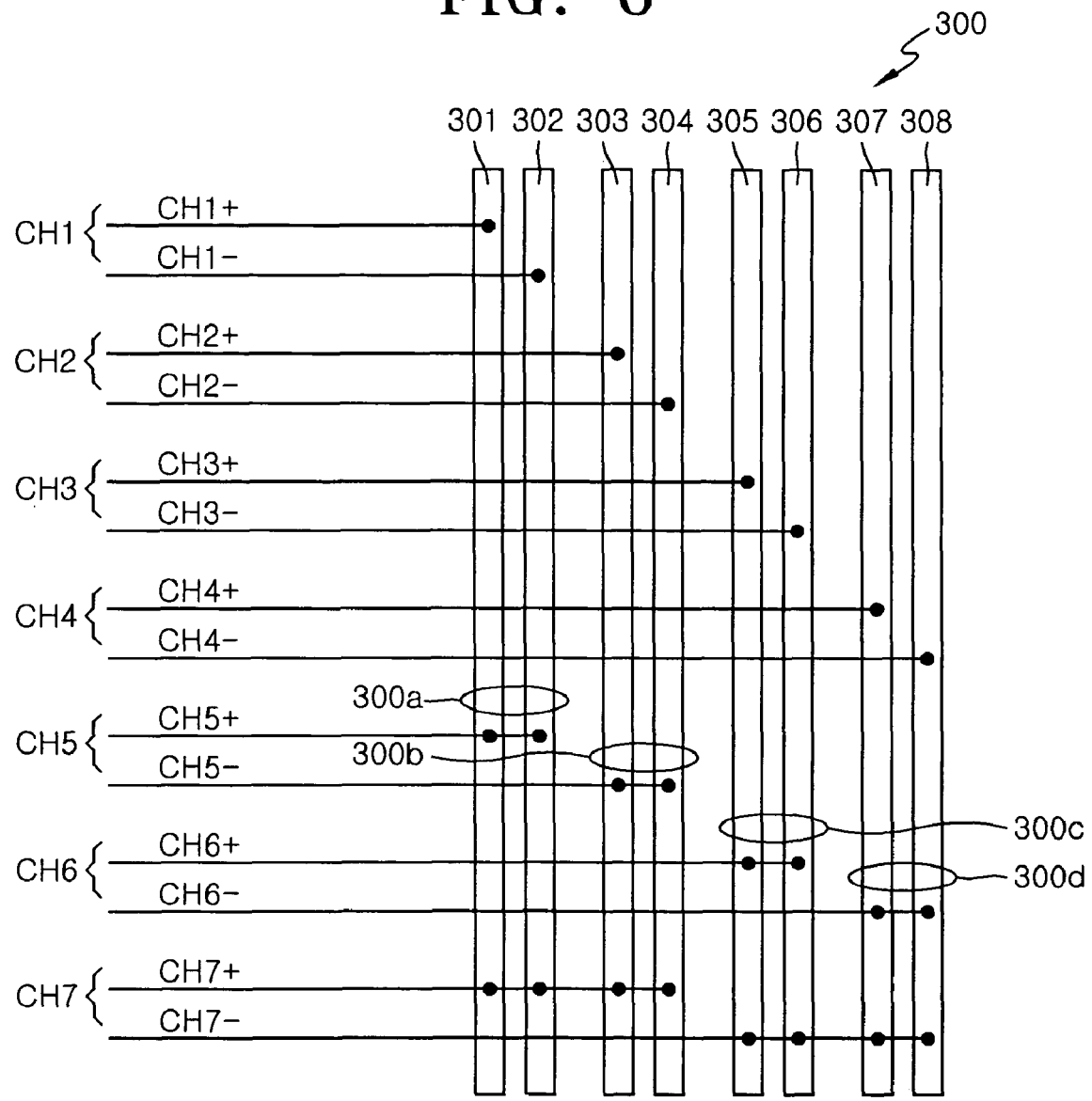
FIG. 6 is a diagram for explaining the conversion of a plurality of channel signals into a plurality of differential signals, according to an embodiment of the present invention.

FIG. 6 is a view for explaining a method of overlapping differential signals of M different arbitrary channels from among a plurality of channels and transferring the overlapping results to each signal line in a differential signal transfer apparatus, according to an embodiment of the present invention.

The differential signal transfer method transfers differential signals of N−1 channels using N signal lines, where N=2$^{M}$, and M is an arbitrary natural number, preferably, a natural number greater than 2. FIG. 6 illustrates a case where M is 3, and thus differential signals of 7 channels are transferred through 8 signal lines.

Referring to FIG. 6, a differential signal pair for a first channel CH1 includes a first differential signal CH1(+) and a second differential signal CH1(−) having opposite phases. Likewise, the differential signal pairs for a second channel CH2 through a seventh channel CH7 respectively include first and second differential signals (CH2(+), CH2(−)) through (CH7(+), CH7(−)), wherein each pair includes first and second differential signals having opposite phases.

The first and second differential signals of a first set of 2$^{M-1}$ channel signals among the 2$^{M}$−1 channel signals are respectively provided to the 2$^{M}$ signal lines. In the example of this embodiment, since M is 3, and 2$^{M-1}$ is 4. Thus, the differential signal pairs of the first through fourth channels CH1 through CH4 are respectively provided to the first through eighth signal lines 301 through 308 as shown in FIG. 6. That is, the first and second differential signals CH1(+) and CH1(−) of the first channel CH1 are respectively provided to the neighboring first and second signal lines 301 and 302. The first and second differential signals CH2(+) and CH2(−) of the second channel CH2 are respectively provided to the neighboring third and fourth signal lines 303 and 304. The first and second differential signals CH3(+) and CH3(−) of the third channel CH3 are respectively provided to the neighboring fifth and sixth signal line 305 and 306. Finally, first and second differential signals CH4(+) and CH4(−) of the fourth channel CH4 are respectively provided to the neighboring seventh and eighth signal lines 307 and 308. Although the first and second differential signals (CH1(+), CH1(−)) through (CH4(+), CH4(−)) of the first through fourth channels CH1 through CH4 are sequentially provided to the first through eighth signal lines 301 through 308, the invention is not limited to such a sequential arrangement.

Still referring to FIG. 6, the first and second differential signals of a second set of 2$^{M-2}$ channel signals among the remaining 2$^{M-1}$−1 channel signals are each provided to different pairs of signal lines among the 2$^{M}$ signal lines. In this example, since M is 3 and 2$^{M-2}$ is 2. Thus, two of the remaining differential signals CH5, CH6 and CH7 are applied to the pairs of the signal lines 301 through 308. In this particular example, the differential signal CH5(+) is applied to a signal line pair 300a which consists of the signal lines 301 and 302. The differential signal CH5(−) is applied to a signal line pair 300b which consists of the signal lines 303 and 304. The differential signal CH6(+) is applied to a signal line pair 300c which consists of the signal lines 305 and 306. The differential signal CH6(−) is applied to a signal line pair 300d which consists of the signal lines 307 and 308. Again, the invention is not limited to the sequential arrangement shown in the example of FIG. 6.

Finally, the first and second differential signals of the remaining set of 2$^{M-3}$ channel signals are each provided to two different pairs of signal lines from among the 2$^{M}$ signal lines. In this embodiment, since M is 3 and 2$^{M-3}$ is 1. In this example, the one remaining channel signal is the CH7 channel signal. It is assumed that one of the fifth through seventh channels CH5 through CH7, but except for the first through fourth channels CH1 through CH4, from among the first through seventh channels CH1 through CH7 is CH7. That is, since the first differential signal CH7(+) of the seventh channel CH7 is provided simultaneously to both neighboring signal line pairs 300a and 300b from among the four signal line pairs 300a through 300d, the first differential signal CH7(+) of the seventh channel CH7 is provided simultaneously to the first through fourth signal lines 301 through 304. Since the second differential signal CH7(−) of the seventh channel CH7 is provided simultaneously to both neighboring signal line pairs 300c and 300d, the second differential signal CH7(−) of the seventh channel CH7 is provided simultaneously to the fifth through eighth signal lines 305 through 308. Once again, the invention is not limited to the sequential arrangement of FIG. 6.

According to the present embodiment, the 2$^{M}$−1 channel signals are divided into M different sets of channels signals. Each m-th set (where m is 1 to M) includes 2$^{M-m}$ channel signals. Further, each of the first and second differential signals of each m-th set of channel signals is applied to 2$^{m-1}$ of the 2$^{M}$ signal lines. Also, each of the 2$^{M}$ signal lines includes M overlapping first or second differential signals of the 2$^{M}$−1 channel signals.

In the example of FIG. 6, the channel signals CH1 through CH7 are divided into three (3) sets (M=3). The first set (m=1) of CH1 through CH4 contains four channel signals since $2^{M-m}=4$; the second set (m=2) of CH5 and CH6 contains two (2) channels signals since $2^{M-m}=2$; the third set (m=3) of CH7 contains one (1) channel signal since $2^{M-m}=1$. Again, it is noted that the channel signals within each set do not need to be sequentially arranged.

The differential signals CH1(+) and CH1(−) of the first set of CH1 through CH4 are each connected to one ($2^{m-1}=1$) of the signal lines 301 through 308 as shown in FIG. 6. The differential signals CH1(+) and CH1(−) of the second set of CH5 through CH6 are each connected to two ($2^{m-1}=2$) of the signal lines 301 through 308 as shown in FIG. 6. The differential signals CH1(+) and CH1(−) of the third set of CH7 are each connected to four ($2^{m-1}=4$) of the signal lines 301 through 308 as shown in FIG. 6.

As stated above, each of the signal lines includes M overlapping differential signals. These overlapping differential signals may be referred to as pseudo differential signals. In the example of FIG. 6, each of the signal lines 301 through 308 includes three overlapping differential signals which are simultaneously applied thereto. More particularly, the first signal line 301 applied with the first differential signals CH1 (+), CH5(+), and CH7(+); the second signal line 302 is applied with the second differential signal CH1(−) and the first differential signals CH5(+) and CH7(+); the third signal line 303 is applied with the first differential signals CH2(+) and CH7(+) and the second differential signal CH5(−); the fourth signal line 304 is applied with the second differential signals CH2(−) and CH5(−) and the first differential signal CH7(+); the fifth signal line 305 is applied with the first differential signals CH3(+) and CH6(+) and the second differential signal CH7(−); the sixth signal line 306 is applied with the second differential signals CH3(−) and CH7(−) and the first differential signal CH6(+); the seventh signal line 307 is applied with the first differential signal CH4(+) and the second differential signals CH6(−) and CH7(−); the eighth signal line 308 is applied with the second differential signals CH4(−), CH6(−) and CH7(−).

FIG. 7 illustrates a matrix for a differential signal converting method, according to an embodiment of the present invention. Referring to FIGS. 4 and 7, FIG. 7 (a) illustrates a case where signals provided from channels to signal lines are expressed by a matrix, wherein $V_{P\_1}, V_{P\_2}, \ldots, V_{P\_N-1}, V_{P\_N}$ denote the levels of the signals provided to the respective signal lines 301 through 30N, and $V_{L\_1}, V_{L\_2}, \ldots, V_{L\_2M-1}$ are the levels of the signals provided to the respective channels CH1 through CH$2^M-1$. FIG. 7 (c) illustrates the corresponding matrix $SM^{-1}$ when N=4. (FIGS. 7 (d) and (e) illustrate the corresponding matrix $SM^{-1}$ when N=8 and the corresponding matrix $SM^{-1}$ when N=16, respectively. Referring to FIG. 7, when the number N for the signal lines is 4 (N=4), three differential signals, except for ½, ½, ½, and ½ can be transferred, when N=8, seven differential signals, except for ⅛, ⅛, . . . , ⅛, ⅛, can be transferred, and when N=16, 15 differential signals, except for 1/16, 1/16, 1/16, . . . , 1/16, 1/16, 1/16, can be transferred.

Here, ¼, ¼, −¼, and −¼ when N=4, ⅛, ⅛, ⅛, ⅛, −⅛, −⅛, −⅛, −⅛ when N=8, and 1/16, 1/16, . . . , 1/16, 1/16, −1/16, −1/16, . . . , −1/16, −1/16 when N=16, from among the differential signals, are not differential signals when seen from a pair of neighboring signal lines, however, are considered as differential signals 1 and −1 when seen from the far-field and thus resist Electromagnetic Interference (EMI). The signals are called pseudo differential signals. Referring to FIGS. 6 and 7, when 7 channel signals are transferred through 8 signal lines, four channel signals CH1 through CH4 are transferred in a format of a differential signal 1-1, two channel signals CH5 and CH6 are transferred in a format of a pseudo differential signal 11-1-1, and the remaining channel signal CH7 is transferred in a format of a pseudo differential signal 1111-1-1-1-1. Accordingly, when $2^M-1$ channel signals are transferred through $2^M$ signal lines, $2^{M-1}$ channel signals are transferred as differential signals and the remaining $2^{M-1}-1$ channel signals are transferred as pseudo differential signals.

Figure 8:
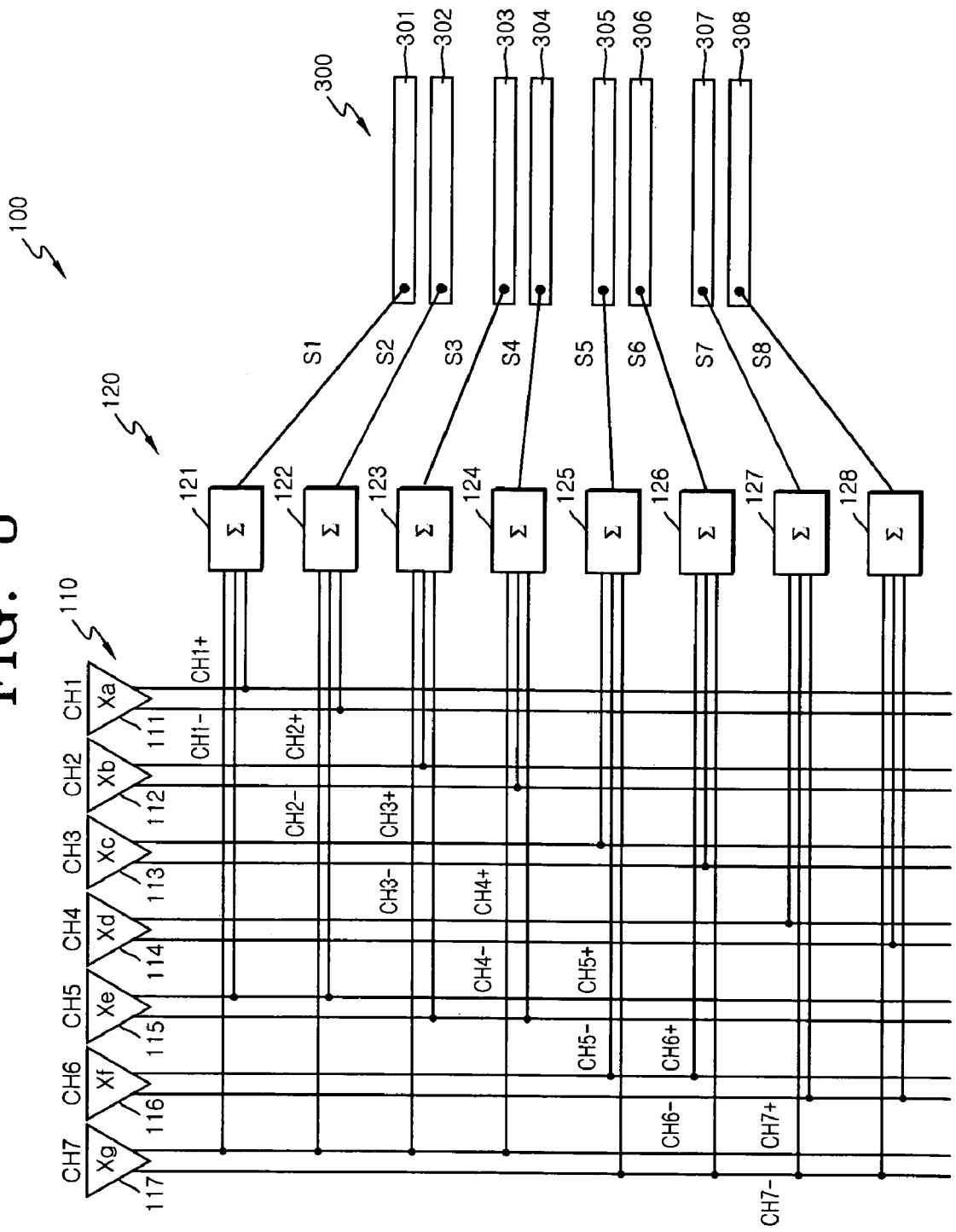
FIG. 8 illustrates a circuit diagram of an output driver circuit according to an embodiment of the present invention.

FIG. 8 illustrates an example of an output driver circuit 100 for implementing the differential signal transfer method according to the above-described embodiment of the present invention. The output driver circuit 100 is used to transfer differential signals of $2^M-1$ channels CH1 through CH$2^M-1$ through $2^M$ (=N) signal lines. FIG. 8 illustrates the case when M=3.

Referring to FIG. 8, the output driver circuit 100 includes a signal converter 110 for respectively the channel signals CH1 through CH7 into differential signal pairs (CH1(+), CH1(−)) through (CH7(+), CH7(−)), and a signal overlapping unit 120 for receiving the differential signal pairs (CH1(+), CH1(−)) through (CH7(+), CH7(−)) and generating a plurality of overlapping signals S1 through S8.

The signal converter 110 includes $2^M-1$ output buffers 111 through 117. Each output buffer 111 through 117 receives one of the channel signals CH1 through CH7, and generates corresponding differential signal pairs CH1(+) and CH1(−) having opposite phases.

The signal overlapping unit 120 includes $2^M$ adders 121 through 128 that each receive and add three differential signals provided from different output buffers 111 through 117. It is noted here that the configuration of FIG. 8 corresponds to that of previously described FIG. 6. For example, in FIG. 6, the eighth signal line 308 is applied with the second differential signals CH4(−), CH6(−) and CH7(−). Likewise, in FIG. 8, the second differential signals CH4(−), CH6(−) and CH7(−) are supplied to the adder 128 which has its output connected to the signal line 308.

The $2^M-1$ output buffers are divided into M sets, where the output buffers of each m-th set (m=1 to M) have a gain X of $2^{-m}$. In the example of FIG. 8, the first through fourth output buffers 111 through 114 constitute a first set (m=1) in which the respective gains thereof are Xa=Xb=Xc=Xd=½. The fifth and sixth output buffers 115 and 116 constitute a second set (m=2) in which the respective gains thereof are Xe=Xf=¼. The seventh output buffer 117 constitutes a third set (m=3) in which the gain thereof is Xg=⅛.

The first adder 121 adds the first differential signal CH1(+) of the first channel CH1, the first differential signal CH5(+) of the fifth channel CH5, and the first differential signal CH7(+) of the seventh channel CH7, generates an overlapping signal S1, and provides the overlapping signal S1 as a pseudo differential signal to the first signal line 301 of the interconnection unit 300. The second adder 122 adds the second differential signal CH1(−) of the first channel CH1, the first differential signal CH5(+) of the fifth channel CH5, and the first differential signal CH7(+) of the seventh channel CH7, generates an overlapping signal S2, and provides the overlapping signal S2 as a pseudo differential signal to the second signal line 302. The third adder 123 adds the first differential signal CH2(+) of the second channel CH2, the second differential signal CH5(−) of the fifth channel CH5, and the first differential signal CH7(+) of the seventh channel CH7, generates an overlapping signal S3, and provides the overlapping signal S3 as a pseudo differential signal to the third signal line 303. The fourth adder 124 adds the second differential signal CH2(−) of the second channel CH2, the second differential signal CH5(−) of the fifth channel CH5, and the first differential signal CH7(+) of the seventh channel CH7, generates an overlapping signal S4, and provides the overlapping signal S4 as a pseudo differential signal to the first signal line 304.

The fifth adder 125 adds the first differential signal CH3(+) of the third channel CH3, the first differential signal CH6(+) of the sixth channel CH6, and the second differential signal CH7(−) of the seventh channel CH7, generates an overlapping signal S5, and provides the overlapping signal S5 as a pseudo differential signal to the fifth signal line 305. The sixth adder 126 adds the second differential signal CH3(−) of the third channel CH3, the first differential signal CH6(+) of the sixth channel CH6, and the second differential signal CH7(−) of the seventh channel CH7, generates an overlapping signal S6, and provides the overlapping signal S6 as a pseudo differential signal to the sixth signal line 306. The seventh adder 127 adds the first differential signal CH4(+) of the fourth channel CH4, the second differential signal CH6(−) of the sixth channel CH6, and the second differential signal CH7(−) of the seventh channel CH7, generates an overlapping signal S7, and provides the overlapping signal S7 as a pseudo differential signal to the seventh signal line 307. The eighth adder 128 adds the second differential signal CH4(−) of the fourth channel CH4, the second differential signal CH6(−) of the sixth channel CH6, and the second differential signal CH7(−) of the seventh channel CH7, generates an overlapping signal S8, and provides the overlapping signal S8 as a pseudo differential signal to the eighth signal line 308.

Figure 9:
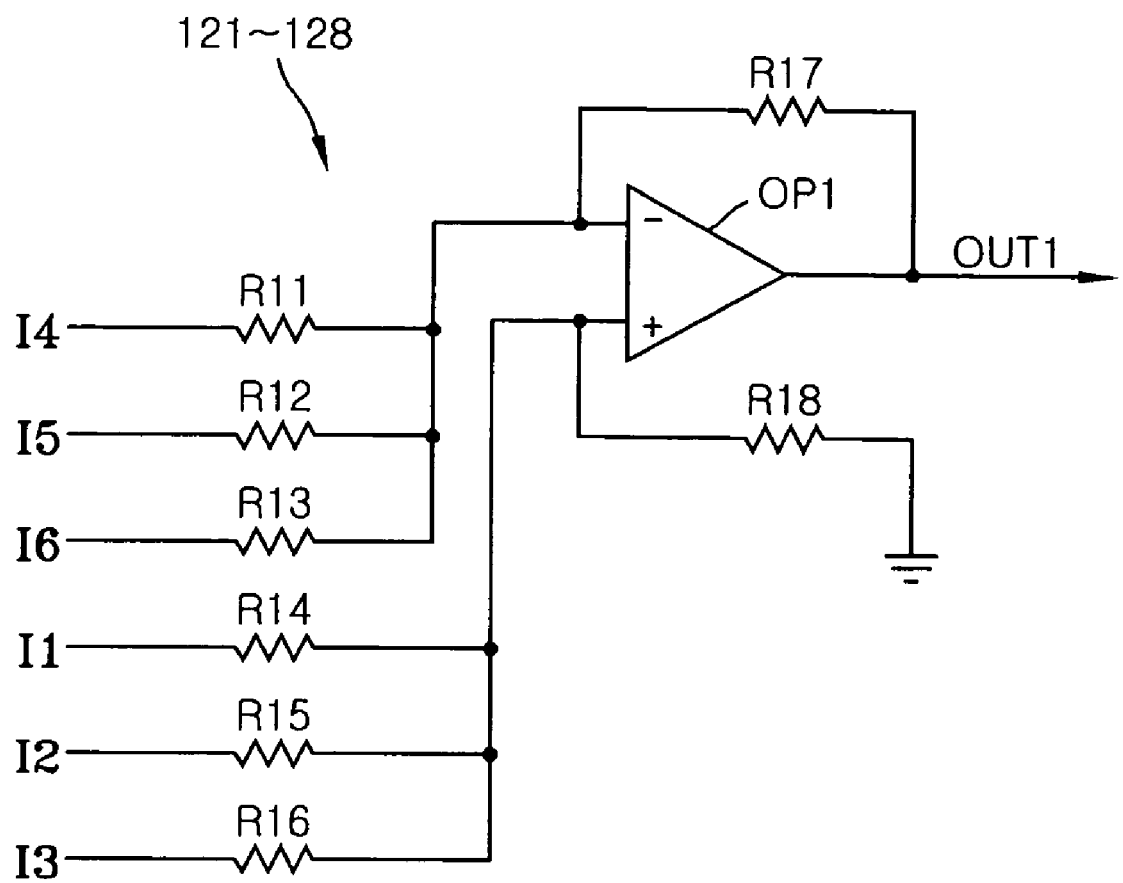
FIG. 9 illustrates a circuit diagram of an adder included in the output driver circuit illustrated in FIG. 8, according to an embodiment of the present invention.

FIG. 9 illustrates a circuit diagram of an example of one of the adders 121 through 128 included in the output driver circuit 100 illustrated in FIG. 8. Like the previous examples, the adder of FIG. 9 shows the example where M=3.

Referring to FIG. 9, the adder includes input terminals for six (2M) input signals I1 through I6, an operational amplifier OP1 and resistors R11 through R18. As explained below, although six input signals are illustrated, only three (M) input signals are actually applied to each of the adders 121 through 128 (see FIG. 8). That is, the second (−) differential signal or signals (if any) from among the signals provided from the respective output buffers 111 through 117 are applied as the input signals I4 through I6, and the first (+) differential signal or signals (if any) from among the signals provided from the respective output buffers 111 through 117 are applied as the input signals I1 through I3. The input signals I4 through I6 are provided to an inverted terminal (−) of the operational amplifier OP1 through the resistors R11 through R13, which are connected in parallel to each other. The input signals I1 through I3 are provided to a non-inverted terminal (+) of the operational amplifier OP1 through the resistors R14 through R16, which are connected in parallel to each other.

If the resistors R11 through R18 have the same resistance, an output signal OUT1 of the adders 121 through 128 provided to each of the signal lines 301 through 308 becomes OUT1=I1+I2+I3−I4−I5−I6. For example, in the case of the adder 121, the differential signals CH1(+), CH5(+), and CH7 (+) are provided as input signals I1, I2, and I3, and thus the output signal OUT1 becomes OUT1=CH1(+)+CH5(+)+CH7 (+) as seen in Table 1 below. In the case of the adder 122, differential signals CH5(+), CH7(+) and CH1(−) are provided as input signals I1, I2, and I4, and thus the output signal OUT1 becomes OUT1=I1+I2+I4=CH5(+)+CH7(+)+CH1 (−). The output signals OUT1 of the remaining adders 123 through 128 is shown below in Table 1. As illustrated in FIG. 8, if both non-inverted outputs and inverted outputs are generated as outputs of channels CH1 through CH7, the adders 121 through 128 are used only for summation, however, if the outputs of the channels CH1 through CH7 are generated with one sign of non-inverted outputs or inverted outputs, the adders 121 through 128 generate output signals using both summation and subtraction.

TABLE 1

|  | Output(OUT1 = I1 + I2 + I3 − I4 − I5 − I6) |
| --- | --- |
| First Adder 121 | OUT1 = CH1(+) + CH5(+) + CH7(+) |
| Second Adder 122 | OUT1 = CH1(−) + CH5(+) + CH7(+) |
| Third Adder 123 | OUT1 = CH2(+) + CH5(−) + CH7(+) |
| Fourth Adder 124 | OUT1 = CH2(−) + CH5(−) + CH7(+) |
| Fifth Adder 125 | OUT1 = CH3(+) + CH6(+) + CH7(−) |
| Sixth Adder 126 | OUT1 = CH3(−) + CH6(+) + CH7(−) |
| Seventh Adder 127 | OUT1 = CH4(+) + CH6(−) + CH7(−) |
| Eighth Adder 128 | OUT1 = CH4(−) + CH6(−) + CH7(−) |

Figure 10:
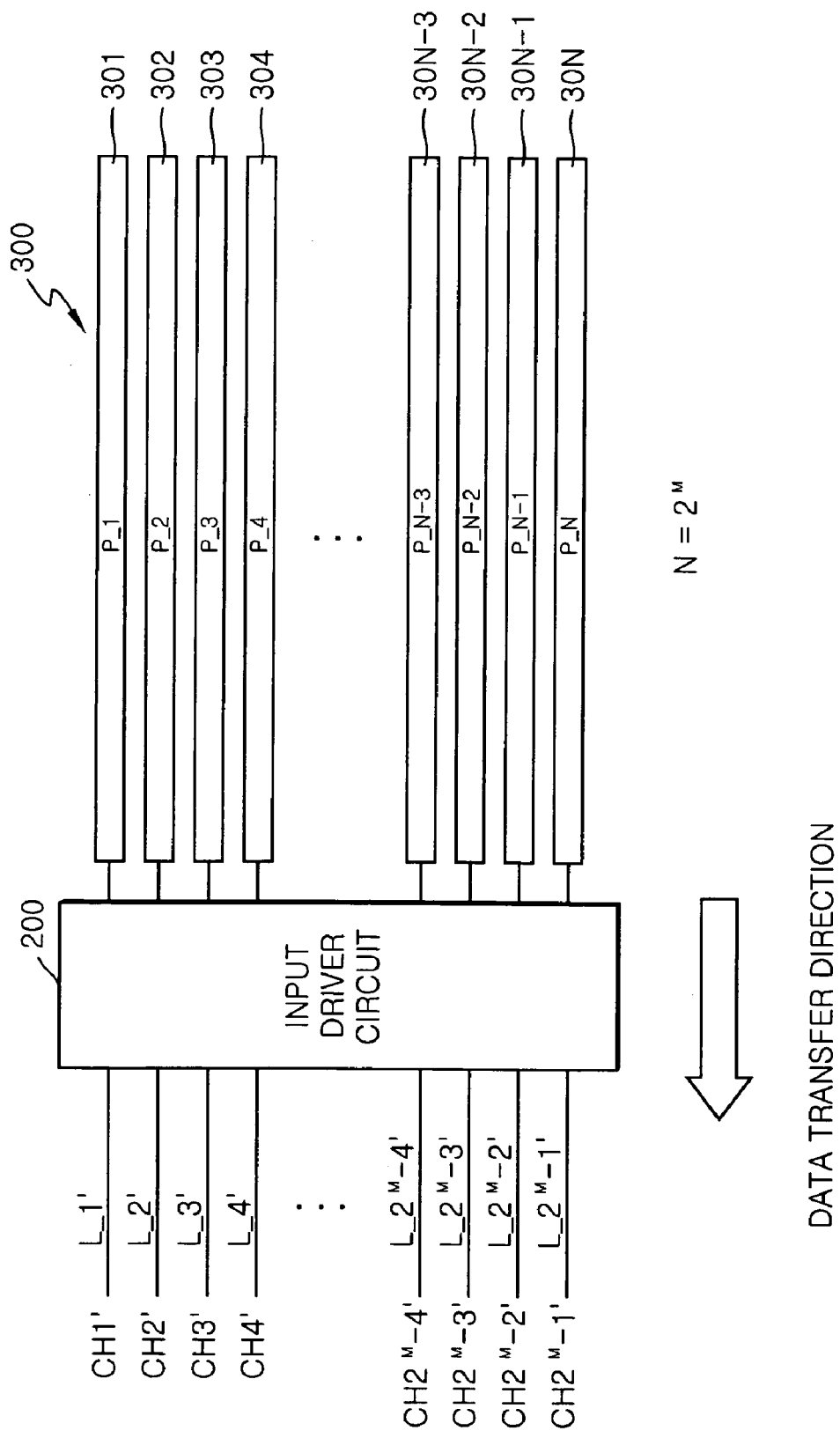
FIG. 10 illustrates an input driver circuit according to an embodiment of the present invention.

FIG. 10 illustrates an input driver circuit 200 for transferring differential signals according to an embodiment of the present invention.

Referring to FIG. 10, the input driver circuit 200 receives N ($=2^M$) pseudo differential signals respectively from N signal lines 301 through 30N and restores $2^M-1$ output channel signals CH1' through CH$2^M-1$'. As explained in more detail below, the $2^M-1$ output channel signals are divided into M sets of channels signals, where each m-th set (m=1 to M) of channels signals includes $2^{M-m}$ channel signals. In order to restore the $2^{M-m}$ channel signals of each m-th set, the input driver circuit 200 overlaps pseudo differential signals from $2^m$ of the signal lines signal lines 301 through 30N.

Figure 11:
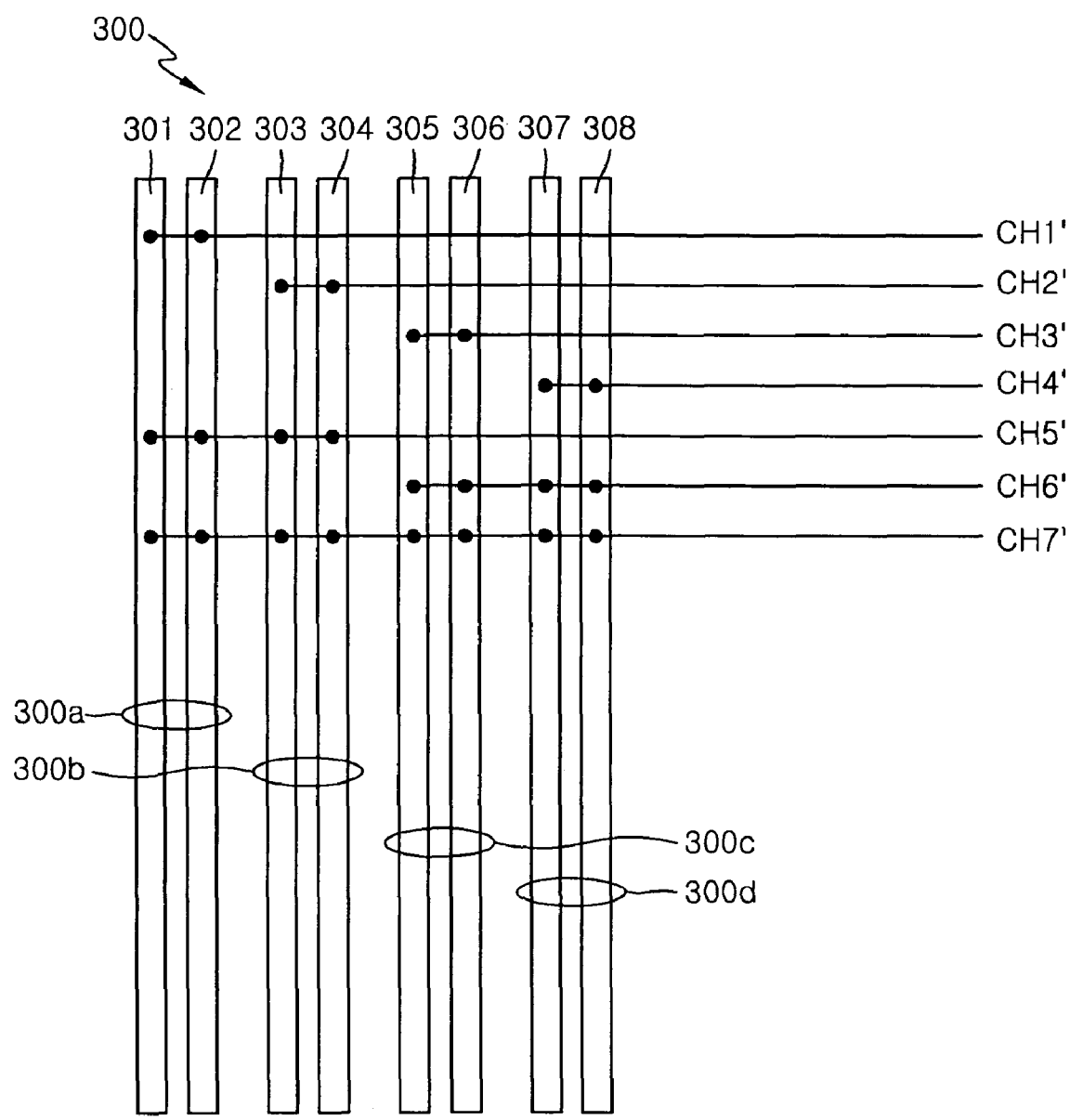
FIG. 11 is a diagram for explaining the restoration of a plurality of channel signals from signals provided through a plurality of signal lines, according to an embodiment of the present invention.

FIG. 11 illustrates an example in which M=3, and accordingly, the output channel signals CH1' through CH7' are divided into three sets. That is, the first set (m=1) includes four channel signals CH1' through CH4', the second set (m=2) includes two channel signals CH5' through CH6', and the third set (m=3) includes one channel signal CH7'. It is noted, however, that the channel signals need not be sequentially arranged within each set.

The output channel signals of the first set (m=1) of channel signals CH1' through CH4' are restored by overlapping differential signals from two ($2^m=2$) of the signal lines 301 through 30N. In this example, the overlapping pseudo differential signals are obtained from adjacent pairs 300a through 300d of the signal lines as shown in FIG. 11. In particular, output channel CH1' is restored by overlapping pseudo differential signals from signals lines 301 and 302; output channel CH2' is restored by overlapping pseudo differential signals from signals lines 303 and 304; output channel CH3' is restored by overlapping pseudo differential signals from signals lines 305 and 306; output channel CH4' is restored by overlapping pseudo differential signals from signals lines 307 and 308.

The output channel signals of the second set (m=2) of output channel signals CH5' and CH6' are restored by overlapping pseudo differential signals from four ($2^m=4$) of the signal lines 301 through 30N. In this example, the overlapping pseudo differential signals are obtained from adjacent sets of four of the signal lines 301 through 308 as shown in FIG. 11. In particular, output channel CH5' is restored by overlapping pseudo differential signals from signals lines 301 through 304, and output channel CH6' is restored by overlapping pseudo differential signals from signals lines 305 through 306.

The output channel signals of the third set (m=3) of output channel signal CH8' is restored by overlapping pseudo differential signals from eight ($2^m=8$) of the signal lines 301 through 30N. In this example, the overlapping pseudo differential signals are obtained from all of the signal lines 301 through 308 as shown in FIG. 11.

FIG. 12 illustrates a matrix for a method of overlapping signals provided from $2^M$ (=N) signal lines 301 through 30N and restoring $2^M-1$ channel signals CH1 through CH$2^M-1$ from differential signals, according to an embodiment of the present invention. FIG. 12 (a) illustrates a matrix demonstrating a theory in which channel signals are restored. FIGS. 12 (b), (c), and (d) illustrate an SM value when M=2, an SM value when M=3, and an SM value when M=4, respectively. As can be seen in FIGS. 12 (b), (c), and (d), $2^M-1$ differential signals, but except for a common mode expressed by 1111 and 11 . . . 11, are transferred through $2^M$ signal lines. Referring to FIGS. 11 and 12, when original channel signals CH1' through CH7' are restored using overlapping signals provided through 8 signal lines 301 through 308, the four channel signals CH1' through CH4' are restored by overlapping the overlapping signals of respective signal line pairs 300a, 300b, 300c, and 300d in a format of differential signals. The two channel signals CH5' and CH6' are restored by overlapping the overlapping signals of two adjacent signal line pairs (300a, 300b) and (300c, 300d) in a format of pseudo differential signals. The remaining channel signal CH7' is restored by overlapping the overlapping signals of the four adjacent signal line pairs 300a through 300d in a format of pseudo differential signals. Accordingly, when differential signals transferred through $2^M$ signal lines are restored to $2^M-1$ channel signals, $2^{M-1}$ channel signals overlap and are restored in a format of differential signals, and the remaining $2^{M-1}-1$ channel signals overlap and are restored in a format of pseudo differential signals.

FIG. 13 is a circuit diagram of an example of an input driver circuit 200 according to an embodiment of the present invention.

Referring to FIG. 13, the input driver circuit 200 includes $2^M-1$ adders 211 through 217. The $2^M-1$ adders are divided into M sets of adders, where each set of adders includes $2^{M-m}$ adders (m=1 to M). In the example of FIG. 13, M=3, and accordingly, adders 211 through 217 are divided into three sets. That is, the first set (m=1) includes four ($2^{M-m}=4$) adders 211 through 214, the second set (m=2) includes two ($2^{M-m}=2$) adders 215 and 216, and the third set (m=3) includes one ($2^{M-m}=1$) adder 217. It is noted, however, that the adders need not be sequentially arranged within each set.

The adders 211 through 214 of the first set (m=1) overlap differential signals from two ($2^m=2$) of the signal lines 301 through 30N. In this example, the overlapping signals are obtained from adjacent pairs 300a through 300d of the signal lines as shown in FIG. 13. In particular, output channel CH1' is restored by the adder 211 which overlaps differential signals from signals lines 301 and 302; output channel CH2' is restored by the adder 212 which overlaps differential signals from signals lines 303 and 304; output channel CH3' is restored by the adder 213 which overlaps differential signals from signals lines 305 and 306; output channel CH4' is restored by the adder 214 which overlaps differential signals from signals lines 307 and 308.

The adders 215 and 216 of the second set (m=2) overlap differential signals from four ($2^m=4$) of the signal lines 301 through 30N. In this example, the overlapping signals are obtained from adjacent sets of four of the signal lines 301 through 308 as shown in FIG. 13. In particular, output channel CH5' is restored by the adder 215 which overlaps pseudo differential signals from signals lines 301 through 304, and output channel CH6' is restored by the adder 216 which overlaps pseudo differential signals from signals lines 305 through 306.

The adder 217 of the third set (m=3) overlaps pseudo differential signals from eight ($2^m=8$) of the signal lines 301 through 30N. In this example, the overlapping pseudo differential signals are obtained from all of the signal lines 301 through 308 as shown in FIG. 13.

Figure 14:
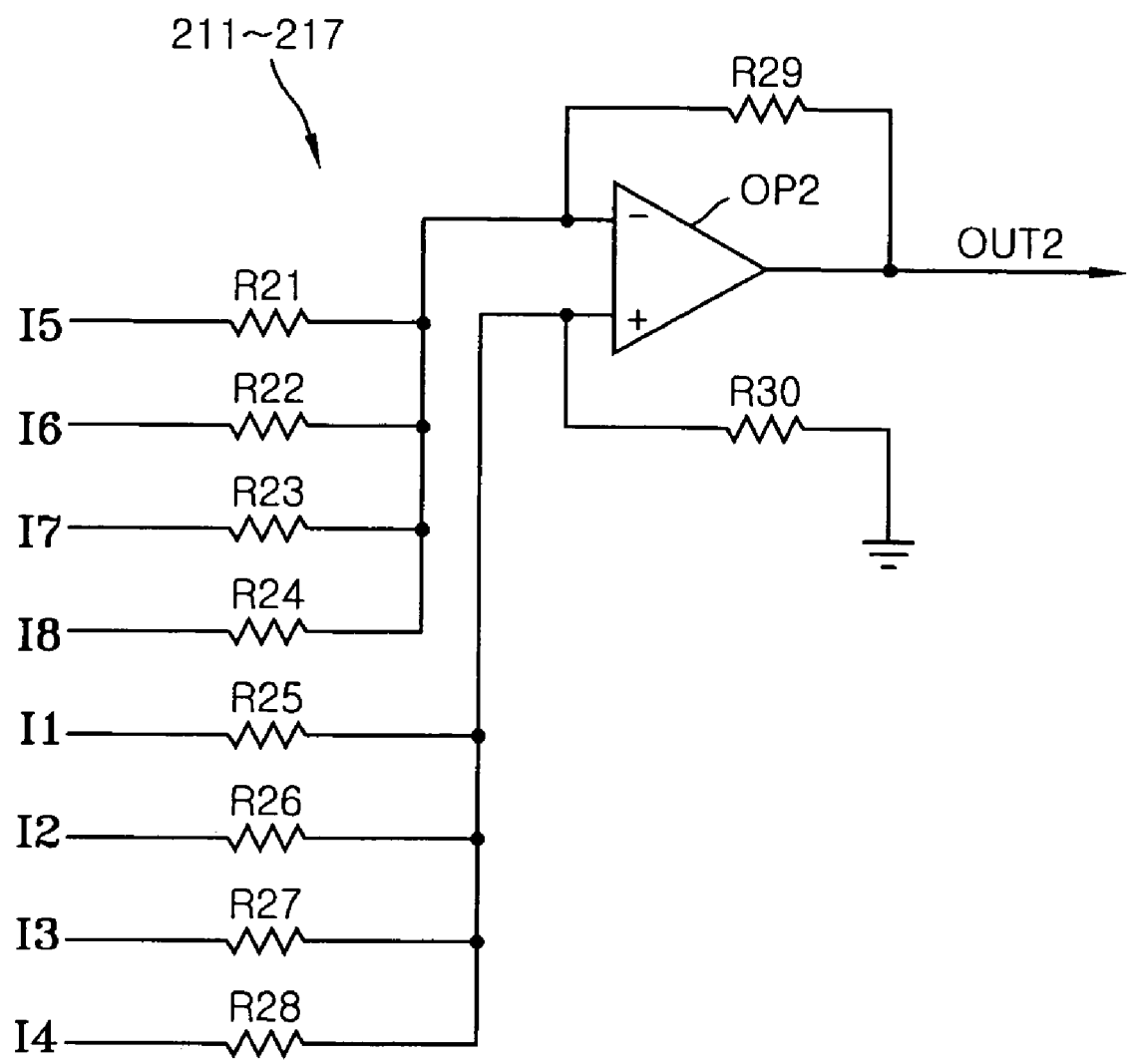
FIG. 14 illustrates a circuit diagram of an adder included in the input driver circuit illustrated in FIG. 13, according to an embodiment of the present invention.

FIG. 14 illustrates a circuit diagram of an example of one of the adders 211 through 217 included in the input driver circuit 200 illustrated in FIG. 13. Like the previous examples, the adder of FIG. 14 shows the example where M=3.

Referring to FIG. 14, the adder includes input terminals for eight ($2^M$) input signals I1 through I8, an operational amplifier OP2 and resistors R21 through R30. As explained below, although eight input signals are illustrated, only two ($2^m$) input signals are actually applied to each of first set (m=1) of adders 211 through 214, only four ($2^m$) input signals are actually applied to each of second set (m=2) of adders 215 and 216, and all eight ($2^m$) input signals are actually applied to the third set (m=3) containing adder 217. The second (−) differential signal or signals (if any) from among the pseudo differential signals provided from the signal lines 301 through 308 are applied as the input signals I5 through I8, and the first (+) differential signal or signals (if any) from among the pseudo differential signals provided from the respective signal lines 301 through 308 are applied as the input signals I1 through I4. The input signals I5 through I8 are provided to an inverted terminal (−) of the operational amplifier OP2 through the resistors R21 through R24, which are connected in parallel to each other. The input signals I1 through I4 are provided to a non-inverted terminal (+) of the operational amplifier OP2 through the resistors R25 through R28, which are connected in parallel to each other.

In the present embodiment, the resistors R21 through R30 have the same resistance, and accordingly, an output signal OUT2 of each of the adders 211 through 217 becomes OUT2=I1+I2+I3+I4−I5−I6−I7−I8.

For example, in the case of the adder 211, a signal provided from the first signal line 301 is applied to the input terminal I1 and a signal provided from the second signal line 302 is applied to the input terminal I5. As described previously, the respective gains (X) of the output buffers 111 through 117 of the output driver circuit 100 are a=b=c=d=½, e=f=¼, and g=⅛, as illustrated in FIG. 8. Accordingly, an overlapping pseudo differential signal applied to the first signal line 301 actually becomes {½CH1(+)+¼CH5(+)+⅛CH7(+)}, and an overlapping pseudo differential signal applied to the second signal line 302 actually becomes {½CH1(−)+¼CH5(+)+⅛CH7(+)}. Accordingly, the output signal OUT2 of the adder 211 satisfies the following Equation.

$$OUT2=I1-I5=\{½CH1(+)+¼CH5(+)+⅛CH7(+)\}-\{(½CH1(-))+¼CH5(+)+⅛CH7(+)\}=½CH1(+)-\{½CH1(-)\}$$

Since the first differential signal CH1(+) and the second differential signal CH1(−) of the first channel CH1 are differential signals having opposite phases, the output signal OUT2 of the adder 211 becomes CH1. Therefore, by overlapping signals of the adjacent signal lines 301 and 302 of a signal line pair 300a through the first adder 211, the first channel signal CH1' is restored.

The remaining adders 212 through 217 also effectively restore the original channels signals. For example, in the case of the seventh adder 217, the overlapping pseudo differential signals provided from the first through fourth signal lines 301 through 304 are applied to the inverted terminal (−) of the operational amplifier OP2, and overlapping pseudo differential signals provided from the fifth through eighth signal lines 305 through 308 are applied to the non-inverted terminal (+)

of the operational amplifier OP2. Thus, the output signal OUT2 of the seventh adder 217 satisfies the following Equation.

$$OUT2 = I1 + I2 + I3 + I4 - I5 - I6 - I7 - I8 =$$

$$= \{1/2CH1(+) + 1/4CH5(+) + 1/8CH7(+)\} +$$

$$\{-1/2CH1(-) + 1/4CH5(+) + 1/8CH7(+)\} +$$

$$\{1/2CH2(+) - 1/4CH5(-) + 1/8CH7\} +$$

$$\{(-1/2CH2(-)) - 1/4CH5(-) + 1/8CH7(+)\} -$$

$$\{1/2CH3(+) + 1/4CH6(+) - 1/8CH7(-)\} -$$

$$\{-1/2CH3(-) + 1/4CH6(+) - 1/8CH7(-)\} -$$

$$\{1/2CH4(+) - 1/4CH6(-) - 1/8CH7(-)\} -$$

$$\{-1/2CH4(-) - 1/4CH6(-) - 1/8CH7(-)\}$$

$$= 1/4\{2CH5(+)\} + 1/8\{2CH7(+)\} - 1/4\{2CH5(-)\} +$$

$$1/8\{2CH7(+)\} - 1/4\{2CH6(+)\} - 1/8\{-2CH7(-)\} -$$

$$1/4\{2CH6(+)\} - 1/8\{-2CH7(-)\} - 1/4\{-CH6(-)\} -$$

$$1/8\{-2CH7(-)\}$$

$$= 1/8\{4CH7(+)\} - 1/8\{-4CH7(-)\}$$

Therefore, since the first differential signal CH7(+) and the second differential signal CH7(−) of the seventh channel signal CH7 are a pair of differential signals having opposite phases, the output signal OUT2 of the seventh adder 217 becomes CH7. Accordingly, by overlapping signals of adjacent signal lines (301, 302) through (307, 308) of four adjacent signal line pairs 300a through 300d through the seventh adder 217, the seventh channel signal CH7' is restored. As such, the input driver circuit 200 restores signals transmitted through the signal lines 301 through 30N using the above-described method, thereby restoring the first through seventh channel signals CH1' through CH7' as seen in Table 2.

TABLE 2

| | OUTPUT(OUT2) = I1 + I2 + I3 + I4 − I5 − I6 − I7 − I8 |
|---|---|
| First Adder 211 | OUT2 = I1 − I5 = {½CH1(+)} − {−½CH1(−)} |
| Second Adder 212 | OUT2 = I2 − I6 = {½CH2(+)} − {−½CH2(−)} |
| Third Adder 213 | OUT2 = I3 − I7 = {½CH3(+)} − {−½CH3(−)} |
| Fourth Adder 214 | OUT2 = I4 − I8 = {½CH4(+)} − {−½CH4(−)} |
| Fifth Adder 215 | OUT2 = I1 + I2 − I5 − I6 = {¼(2CH5(+))} − {−¼(2CH5(−))} |
| Sixth Adder 216 | OUT2 = I3 + I4 − I7 − I8 = {¼(2CH6(+))} − {−¼(2CH6(−))} |
| Seventh Adder 217 | OUT2 = I1 + I2 + I3 + I4 − I5 − I6 − I7 − I8 = {⅛(4CH7(+))} − {−⅛(4CH7(−))} |

Figure 15:
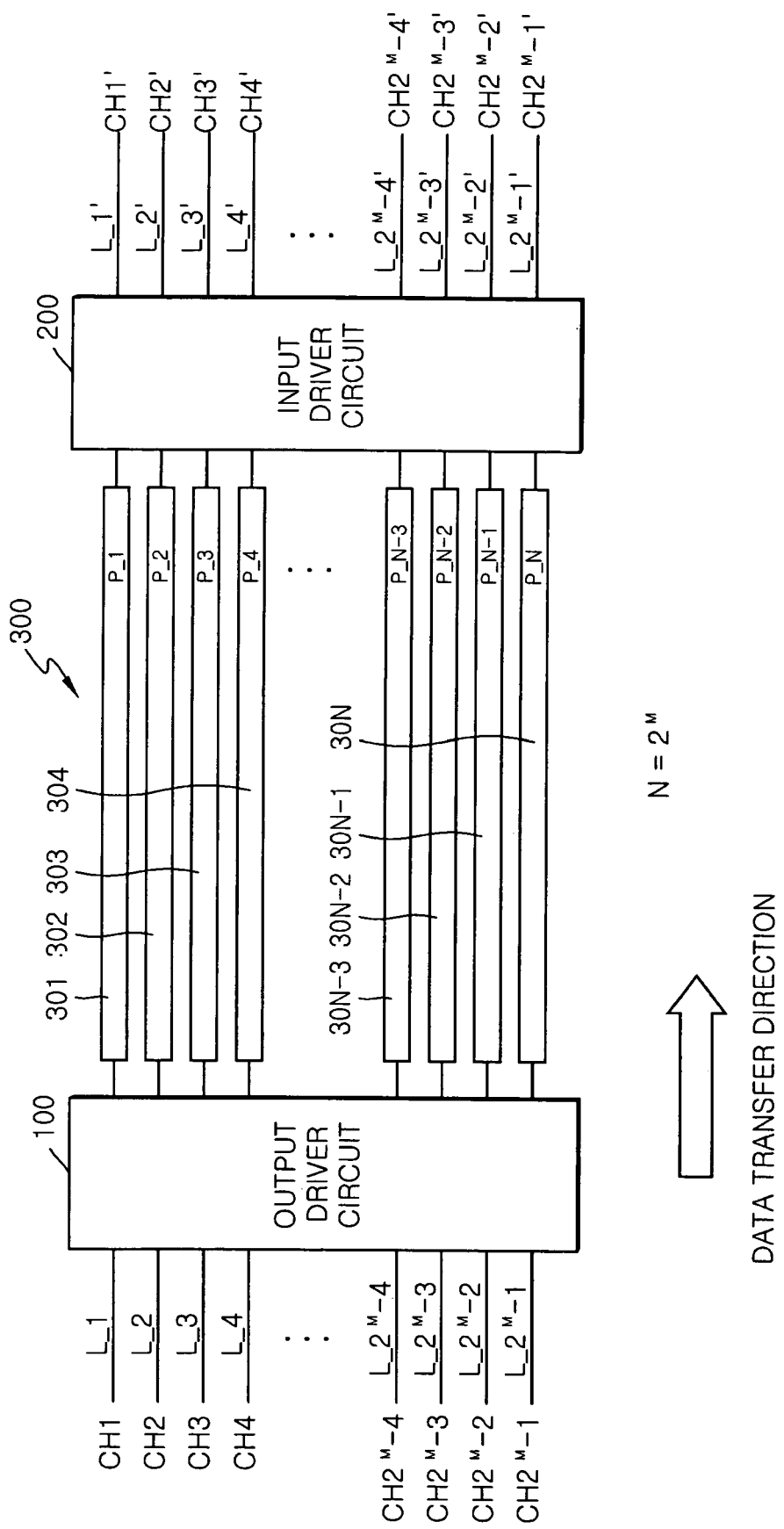
FIG. 15 is diagram of a differential signal transfer apparatus according to an embodiment of the present invention.

FIG. 15 illustrates a configuration diagram of a differential signal transfer apparatus according to an embodiment of the present invention. Referring to FIG. 15, the differential signal transfer apparatus includes an output driver circuit 100, an input driver circuit 200, and an interconnection unit 300. Since the output driver circuit 100 has the configuration as illustrated in FIGS. 4 and 6 through 9, and the input driver circuit 200 has the configuration as illustrated in FIGS. 10 through 14. The interconnection unit 300 includes a plurality of signal lines 301 through 30N. The output driver circuit 100 converts channel signals CH1 through CH$2^M$−1 provided through a plurality of channels into differential signals, overlaps the differential signals of different channels, and transfers the overlapping signals through $2^M$ (=N) signal lines 301 through 30N. The interconnection unit 300 provides signals provided through the output driver circuit 100 to the input driver circuit 200 through the signal lines 301 through 30N. The input driver circuit 200 receives input signals through the signal lines 301 through 30N and restores a plurality of channel signals CH1' through CH$2^M$−1'.

In FIG. 15, a differential signal transfer apparatus in which signals are transferred from the output driver circuit 100 to the input driver circuit 200 is illustrated. However, bi-directional data transmission is also possible. In the bi-directional data transmission, the output driver circuit 100 can dually function as an input driver circuit 200 and/or the input driver circuit 200 can dually function as an output driver circuit 100.

Figure 16:
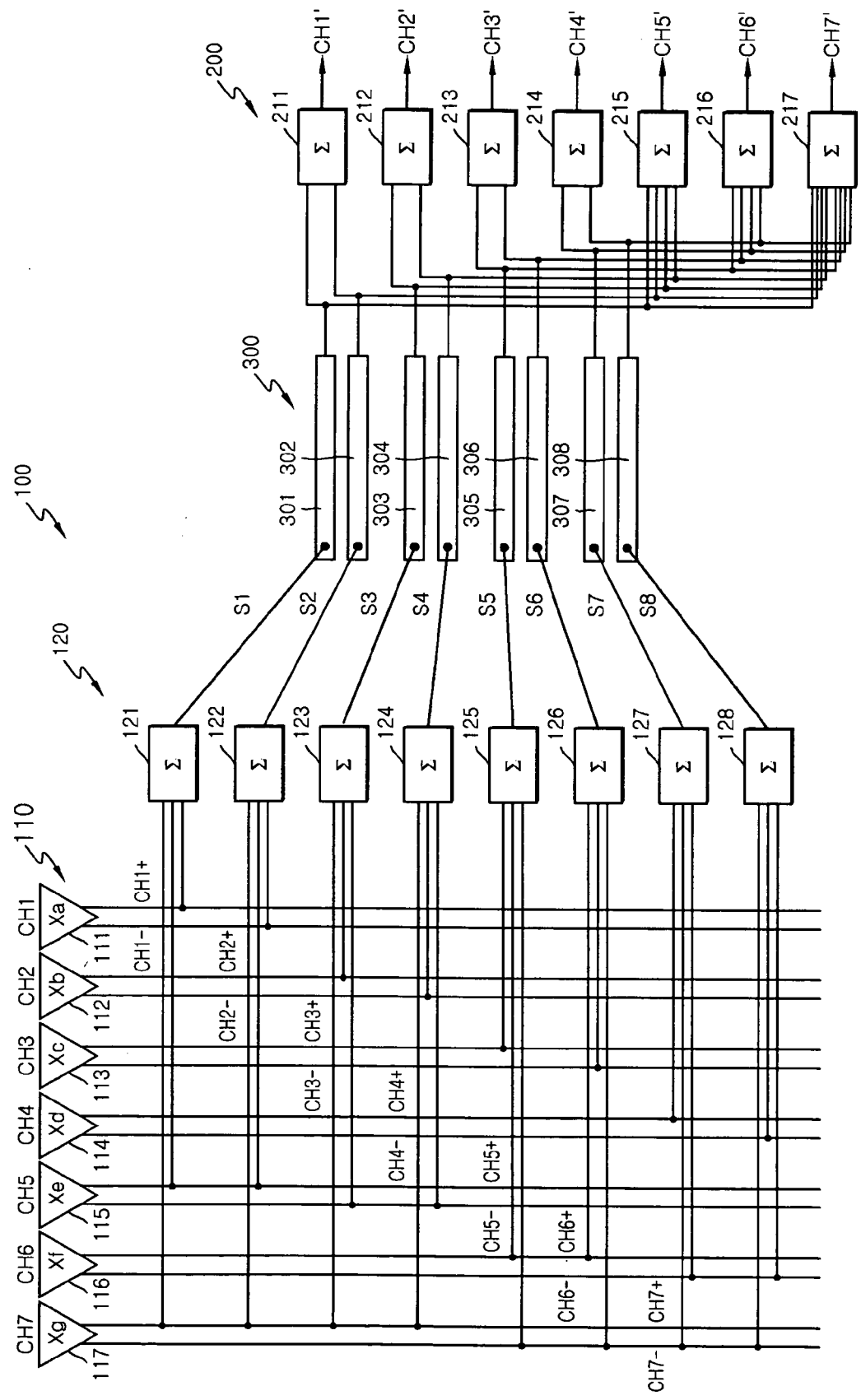
FIG. 16 is a circuit diagram of the differential signal transfer apparatus according to an embodiment of the present invention.

FIG. 16 illustrates a circuit diagram of a differential signal transfer apparatus according to an embodiment of the present invention in which M=3. This figure essentially combines the circuit diagrams of previously described FIGS. 13 and 16, and accordingly, a detailed description of FIG. 16 is omitted here to avoid redundancy. It is noted once again, however, that the invention is not limited to the sequentially selection of channels, buffers, adders, and signal lines to define the overlapping of differential signals. Factors such as signal delay and/or wiring resistance may result in other arbitrary overlapping configurations.

The differential signal transfer apparatus can, for example, be equipped on one or multiple semiconductor chips. For example, input driver circuit, the output driver circuit and an interconnection unit can be integrated into a single chip. Alternately, input driver circuit, the output driver circuit and an interconnection unit can be separately provided on two or more chips.

As described above, in a differential signal transfer method and apparatus according to embodiments of the present invention, by overlapping and transferring differential signals of different channels to signal lines, it is possible to transfer $2^M$−1 channel signals through $2^M$ signal lines. Accordingly, the number of differential channel signals transferable by the differential signal transfer method and apparatus according to embodiments of the present invention substantially greater that of the conventional differential signal transfer method. Also, when compared to the conventional methods, the reduction in the number of signals lines realized by the present embodiments increases as the number of channels increases.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A differential signal transfer method comprising:
    converting $2^M$−1 original signals into $2^M$−1 differential signal pairs, where M is an integer of 2 or more, and wherein each pair consists of a first differential signal and a second differential signal having opposite phases;
    amplifying the $2^M$−1 differential signal pairs to obtain $2^M$−1 amplified differential signal pairs, each amplified differential signal pair consists of a first amplified differential signal and a second amplified differential signal having opposite phases; and
    transferring the amplified $2^M$−1 differential signal pairs to $2^M$ signal lines such that each of the $2^M$ signal lines includes M overlapping amplified differential signals among the first amplified differential signals and the second amplified differential signals of the $2^M-1$ differential signal pairs, wherein the $2^M-1$ original signals are divided into M different sets of original signals, wherein each m-th set (where m is 1 to M) includes $2^{M-m}$ original signals, wherein each of the first and second amplified differential signals of each m-th set of original signals is obtained by amplifying each of the first and second differential signals of each m-th set of original signals by a gain of $2^{-m}$ and wherein each of the first and second amplified differential signals of each m-th set of original signals is applied to m of the $2^M$ signal lines.

2. A differential signal transfer method, comprising:

converting $2^M-1$ original signals into $2^M-1$ differential signal pairs, where M is an integer of 2 or more, and wherein each pair consists of a first differential signal and a second differential signal having opposite phases;

amplifying the $2^M-1$ differential signal pairs to obtain $2^M-1$ amplified differential signal pairs, each amplified differential signal pair consists of a first amplified differential signal and a second amplified differential signal having opposite phases;

overlapping M amplified differential signals selected from a group of the first amplified differential signals and the second amplified differential signals of the $2^M-1$ differential amplified signal pairs and generating $2^M$ overlapping differential signals;

transferring the $2^M$ overlapping differential signals to the $2^M$ signal lines, respectively; and overlapping the $2^M$ overlapping differential signals that are transferred to the $2^M$ signal lines to restore the $2^M-1$ original signals, wherein each m-th set (where m is 1 to M) includes $2^{M-m}$ original signals, wherein each of the first and second amplified differential signals of each m-th set of original signals is obtained by amplifying each of the first and second differential signals of each m-th set of original signals by a gain of $2^{-m}$ and wherein each of the first and second amplified differential signals of each m-th set of original signals is applied to m of the $2^M$ signal lines.

3. A differential signal transfer method, comprising:

converting $2^M-1$ original signals into $2^M$ pseudo differential signals, where M is an integer of 2 or more; and transferring the $2^M$ pseudo differential signals on respective $2^M$ signal lines;

wherein the converting of the $2^M-1$ original signals into $2^M$ pseudo differential signals includes:

converting the $2^M-1$ original signals into $2^M-1$ differential signal pairs, wherein each pair consists of a first differential signal and a second differential signal having opposite phases;

amplifying the $2^M-1$ differential signal pairs to obtain $2^M-1$ amplified differential signal pairs, each amplified differential signal pair consists of a first amplified differential signal and a second amplified differential signal having opposite phases; and adding M amplified differential signals among the first differential signals and the second differential signals of the $2^M-1$ amplified differential signal pairs to obtain each pseudo differential signal, wherein the $2^M-1$ original signals are divided in M different sets of original signals, wherein each m-th set (where m is 1 to M) includes $2^{M-m}$ original signals, wherein each of the first and second amplified differential signals of each m-th set of original signals is obtained by amplifying each of the first and second differential signals of each m-th set of original signals by a gain of $2^{-m}$ and wherein each of the first and second amplified differential signals of each m-th set of original signals is applied to m of the $2^M$ signal lines.

4. The differential signal transfer method of claim 3, further comprising converting the $2^M$ pseudo differential signals transferred on the respective $2^M$ signal lines into the $2^{M-1}$ original signals.

5. The differential signal transfer method of claim 4, further comprising:

receiving the $2^M$ pseudo differential signal pairs from the respective $2^M$ signal lines; and restoring the $2^M-1$ original signals from the pseudo differential signals, wherein each of the $2^{M-m}$ original signals of each m-th set is restored by adding the pseudo differential signals from $2^m$ of the signal lines.

6. An output driver circuit comprising:

a plurality of channels which respective supply $2^M-1$ original binary signals;

a signal converter which converts the $2^M-1$ original signals into $2^M-1$ differential signal pairs, each differential signal pair including of a first differential signal and a second differential signal having opposite phases;

a plurality of output buffers which amplify the $2^M-1$ differential signal pairs to obtain $2^M-1$ amplified differential signal pairs, each amplified differential signal pair consists of a first amplified differential signal and a second amplified differential signal having opposite phases; and a signal overlapping unit which overlaps the $2^M-1$ amplified differential signal pairs onto $2^M$ signal lines such that each of the $2^M$ signal lines includes M overlapping amplified differential signals selected from a group of the first amplified differential signals and the second amplified differential signals of the $2^M-1$ amplified differential signal pairs;

wherein the $2^M-1$ original signals are divided into M different sets of the original signals, wherein each m-th set (where m is 1 to M) includes $2^{M-m}$ original signals, wherein each of the first and second amplified differential signals of each m-th set of original signals is obtained by amplifying each of the first and second differential signals of each m-th set of the original signals by a gain of $2^{-m}$ and wherein each of the first and second amplified differential signals of each m-th set of original signals is applied to m of the $2^M$ signal lines.

7. A differential signal transfer apparatus comprising:

a plurality of channels which supply $2^M-1$ original binary signals, where M is an integer of 2 or more;

a first driver circuit which converts the $2^M-1$ original signals provided from the channels into $2^M-1$ differential signal pairs, wherein each differential pair includes a first differential signal and a second differential signal having opposite phases, and which overlaps M differential signals of the first differential signals and the second differential signals of the $2^M-1$ differential signal pairs to output $2^M$ overlapping signals;

a second driver circuit which converts the $2^M$ overlapping signals into the $2^m-1$ original binary signals; and an interconnection unit which includes $2^M$ signal lines for respectively transferring the $2^M$ overlapping signals provided from the first driver circuit to the second driver circuit;

wherein the first driver circuit comprises:

a signal converter which converts the $2^M-1$ original signals provided from the channels into the $2^M-1$ differential signal pairs; and a signal overlapping unit which overlaps the M differential signals from among the $2^M-1$ differential signal pairs converted by the signal converter and generates the $2^M$ overlapping signals, wherein the signal converter comprises $2^M-1$ output buffers at least two of which have different gains, and wherein the $2^M-1$ output buffers are divided into M different sets of output buffers, wherein each m-th set (where m is 1 to M) includes $2^{M-m}$ output buffers, wherein a gain of each output buffer of each m-th set is $2^{-m}$.

8. The differential signal transfer apparatus of claim 7, wherein the signal overlapping unit comprises $2^M$ adders which each add M differential signals from among the $2^M-1$ differential signal pairs and which respectively generate the $2^M$ overlapping signals.

9. The differential signal transfer apparatus of claim 8, wherein the M differential signals input to each of the $2^M$ adders are from different differential signal pairs.

10. The differential signal transfer apparatus of claim 7, wherein the second driver circuit comprises $2^M-1$ adders which add the $2^M$ overlapping signals provided from the $2^M$ signal lines and generate the $2^M-1$ original signals.

11. The differential signal transfer apparatus of claim 10, wherein the $2^M-1$ adders are divided into M sets of adders, where each set of adders includes $2^{M-m}$ adders (m=1 to M), and wherein the adder of each m-th set adds $2^m$ differential signals.

12. The differential signal transfer apparatus of claim 7, wherein the first driver circuit and the second driver circuit are integrated into a single chip.

13. The differential signal transfer apparatus of claim 7, wherein the interconnection unit is disposed as a separate device or is integrated into a single chip together with the first driver circuit and the second driver circuit.

14. A semiconductor integrated circuit comprising:

a plurality of channels which supply $2^M-1$ original binary signals, where M is an integer of 2 or more;

a first driver circuit which converts the $2^M-1$ original signals provided from the channels into $2^M-1$ differential signal pairs, wherein each differential pair includes a first differential signal and a second differential signal having opposite phases, and which overlaps M differential signals of the first differential signals and the second differential signals of the $2^M-1$ differential signal pairs to output $2^M$ overlapping signals;

a second driver circuit which converts the $2^M$ overlapping signals into the $2^M-1$ original binary signals; and an interconnection unit which includes $2^M$ signal lines for respectively transferring the $2^M$ overlapping signals provided from the first driver circuit to the second driver circuit;

wherein the first driver circuit comprises:

$2^M-1$ output buffers which convert the $2^M-1$ original binary signals provided from the channels into the $2^M-1$ differential signal pairs; and $2^M$ adders which each overlap M differential signals of the $2^M-1$ differential signal pairs converted by the $2^M-1$ output buffers, and which respectively generate the $2^M$ overlapping signals, wherein the $2^M-1$ output buffers are divided into M different sets of output buffers, wherein each m-th set (where m is 1 to M) includes $2^{M-m}$ output buffers, and wherein a gain of each output buffer of each m-th set is $2^{-m}$.

15. The semiconductor integrated circuit of claim 14, wherein the M differential signals input to each of the $2^M$ adders are from different differential signal pairs.

16. The semiconductor integrated circuit of claim 14, wherein the second driver circuit further comprises $2^M-1$ adders which add the $2^M$ overlapping signals provided from the $2^M$ signal lines and generate the $2^M-1$ original signals.

17. The semiconductor integrated circuit of claim 16, wherein the $2^M-1$ adders are divided into M sets of adders, where each set of adders includes $2^{M-m}$ adders (m=1 to M), and wherein the adder of each m-th set adds $2^m$ differential signals.

* * * * *